US00RE47419E

(19) United States
(12) Reissued Patent
Hsu et al.

(10) Patent Number: US RE47,419 E
(45) Date of Reissued Patent: Jun. 4, 2019

(54) LIQUID CRYSTAL DISPLAY DEVICE AND ELECTRONIC EQUIPMENT HAVING THE SAME

(71) Applicant: Wistron Corporation, New Taipei (TW)

(72) Inventors: Ching-Fu Hsu, New Taipei (TW); Tzu-Wei Lin, New Taipei (TW); Lien-Te Kao, New Taipei (TW); Chi-Yeh Lu, New Taipei (TW); Ming-Hung Pan, New Taipei (TW); Ming-Chen Lin, New Taipei (TW); Min-Wei Lin, New Taipei (TW); Ting-Feng Chen, New Taipei (TW); Wan-Bing Xia, New Taipei (TW); Kai-Cheng Yen, New Taipei (TW); Meng Zhang, New Taipei (TW)

(73) Assignee: Wistron Corporation, New Taipei (TW)

(21) Appl. No.: 14/757,225

(22) Filed: Dec. 8, 2015

Related U.S. Patent Documents

Reissue of:
(64) Patent No.: 8,786,799
Issued: Jul. 22, 2014
Appl. No.: 13/433,651
Filed: Mar. 29, 2012

U.S. Applications:
(63) Continuation-in-part of application No. 12/952,126, filed on Nov. 22, 2010, now Pat. No. 8,411,226, and
(Continued)

(51) Int. Cl.
*G02F 1/1333* (2006.01)
*G02F 1/1335* (2006.01)

(52) U.S. Cl.
CPC .. *G02F 1/133308* (2013.01); *G02F 1/133608* (2013.01)

(58) Field of Classification Search
CPC ..... G02F 1/133308; G02B 6/0001
(Continued)

(56) References Cited

U.S. PATENT DOCUMENTS 6,330,148 B1 * 12/2001 Won ..... G06F 1/1616 349/58
6,835,961 B2 * 12/2004 Fukayama ..... 257/84
(Continued)

OTHER PUBLICATIONS

Japanese Patent Office, Office Action and English Translation for Japanese Counterpart Application No. 2012-080474, and Cited References and English Translations for JP2005-43716, JP2008-282045, JP2010-134413; JP2010-238659; JP9-147618; JP11-510846; JP2002-287659; JP11-338371; JP2008-216939; JP2007-52183, JP11-312715, and JP2003-114764.
(Continued)

*Primary Examiner* — Fred O Ferris, III
(74) *Attorney, Agent, or Firm* — JCIPRNET

(57) ABSTRACT

A liquid crystal display device includes a support frame having a bottom wall, and a main surrounding wall extending upwardly from and formed integrally as one piece with the bottom wall. The bottom wall and the surrounding wall cooperatively define a receiving space. The bottom wall includes a first support disposed in the receiving space. The main surrounding wall includes a second support disposed in the receiving space and spacedly above the first support. A backlight module is supported on the first support. A liquid crystal display panel is supported on the second support so that the liquid crystal display panel is positioned above the backlight module.

19 Claims, 22 Drawing Sheets

Related U.S. Application Data a continuation-in-part of application No. 13/237,938, filed on Sep. 21, 2011, now Pat. No. 8,740,447.

(58) Field of Classification Search

USPC ..... 349/58, 65

See application file for complete search history.

(56) References Cited

U.S. PATENT DOCUMENTS

| | | | | |
|---|---|---|---|---|
| 7,165,875 | B2 * | 1/2007 | Ohtomo et al. | 362/632 |
| 7,460,194 | B2 * | 12/2008 | Tsukamoto | G02F 1/133308 349/58 |
| 7,578,610 | B2 * | 8/2009 | Sakamoto | G02F 1/133608 349/58 |
| 7,679,694 | B2 * | 3/2010 | Shirai | G02F 1/133308 349/58 |
| 7,800,730 | B2 * | 9/2010 | Kang | G02F 1/133615 349/149 |
| 7,889,286 | B2 * | 2/2011 | Yoo | G02F 1/133308 349/56 |
| 8,408,780 | B2 * | 4/2013 | Mathew et al. | 362/632 |
| 8,508,684 | B2 * | 8/2013 | Pan et al. | 349/58 |
| 2002/0063812 | A1 * | 5/2002 | Natsuyama | G02F 1/133308 349/58 |
| 2003/0128307 | A1 * | 7/2003 | Ito | G02F 1/133308 349/58 |
| 2007/0059520 | A1 * | 3/2007 | Hatin | G06F 3/0412 428/343 |
| 2007/0297188 | A1 * | 12/2007 | Chu | 362/555 |
| 2010/0045891 | A1 * | 2/2010 | Oh | 349/58 |
| 2011/0128463 | A1 * | 6/2011 | Ji | G02F 1/133308 349/58 |
| 2012/0146930 | A1 * | 6/2012 | Lee | G06F 3/04883 345/173 |

OTHER PUBLICATIONS

Korean International Property Office, Office Action and Cited References for Application No. KR-10-2011-0101020 (KR10-2007-00066634 and English Translation, and KR-10-2003-0005660 and English Counterpart, US Patent No. 6,894,757).

United States Patent and Trademark Office, Office Action, Notice of Allowance, and Cited Reference US7,760,829 for U.S. Appl. No. 12/952,126.

Japanese Patent Office, Office Action and Translation, and Cited References for Application No. JP2011-222-686 (Cited References and Translations for JP2009-86071,JPS64-013522, JP03-122484; JP2002-366044; JP2003-029649; JP2004-258060; JP11-085045; and JP11-202787.

Korean International Property Office, Office Action and Cited References for Application No. KR-10-2012-0033443 (Cited References and Translations for KR-10-2011-0032319, KR-10-2007-0101946 and KR 0107482 English Counterpart US Patent No. 7,505,668)).

Korean International Property Office, Office Action, Translation, and Cited References and Translated Abstracts, for KR-10-2011-0101020 (Cited Reference KR-2004-0046418).

Taiwan Patent and Trademark Office, Office Action, Translation, and Cited References along with the English Translations of their Abstracts for TW200846743 (Cited References TW572220 (corresponding to US Pat. No. 7,209,195), TW521209 (corresponding to US Pat No. 6,507,484), and JP2003-167235 (corresponding to US Pat. No. 6,956,637).

Korean International Property Office, Office Action and English Translation for Application No. KR-10-2011-0101020.

United States Patent and Trademark Office, Notice of Allowance for U.S. Appl. No. 12/952,126.

United States Patent and Trademark Office, Notice of Allowance for U.S. Appl. No. 13/237,938.

Chinese Patent Office, Office Action and English Translation for Chinese Counterpart Application No. 201210079121.0, and Cited References CN1576985A and U.S. Patent No. 7,165,875B2.

* cited by examiner

LIQUID CRYSTAL DISPLAY DEVICE AND ELECTRONIC EQUIPMENT HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation-in-part of U.S. patent application Ser. No. 12/952,126 filed on Nov. 22, 2010 and Ser. No. 13/237,938 filed on Sep. 21, 2011, the disclosures of each of which are incorporated herein by reference.

This application claims priority of Chinese Patent Application Nos. 201110081284.8 filed on Apr. 1, 2011; 201110116425.5 filed on May 6, 2011; and 201210079121.0 filed on Mar. 22, 2012, the disclosures of each of which are also incorporated herein by reference.

BACKGROUND OF THE INVENTION

1. Field of the Invention

The disclosure relates to a display device, more particularly to a frame structure of a liquid crystal display device and an electronic equipment having the liquid crystal display device.

2. Description of the Related Art

A currently available liquid crystal display module (LCM) includes a lower metal frame that accommodates therein a plastic frame, a backlight module disposed in the lower metal frame, and a liquid crystal display panel mounted on the plastic frame and disposed above the backlight module. Through an upper metal frame that is assembled to a periphery of the lower metal frame and that abuts against a top end of the liquid crystal display panel, the liquid crystal display panel can be stably positioned on the plastic frame. At this time, the assembly of the liquid crystal display module is completed. The liquid crystal display module is then sent to a system integrator where the liquid crystal display module is assembled between upper and lower casings.

However, this kind of liquid crystal display module has a complicated structure and involves many components, so that the assembly thereof is time-consuming and the manufacturing cost associated therewith is increased.

SUMMARY OF THE INVENTION

Therefore, an object of the present disclosure is to provide a liquid crystal display device having a one-piece frame structure that can minimize the number of components so that the structure thereof is simple, the assembly time can be reduced, the manufacturing cost associated therewith can be saved, and tolerances among the components can also be reduced.

The object of the present disclosure and the solution to the problem existing in the prior art can be realized by using the below technical means. According to the present disclosure, a liquid crystal display device comprises a support frame, a backlight module, and a liquid crystal display panel.

The support frame includes a bottom wall, and a main surrounding wall extending upwardly from and formed integrally as one piece with the bottom wall. The bottom wall and the surrounding wall cooperatively define a receiving space. The bottom wall includes a first support disposed in the receiving space. The main surrounding wall includes a second support disposed in the receiving space and spacedly above the first support. The backlight module is supported on the first support. The liquid crystal display panel is supported on the second support so that the liquid crystal display panel is positioned above the backlight module.

The object of the present disclosure and the solution to the problem existing in the prior art can be realized by using the below technical means.

Each of the first support and the second support has a horizontal support face.

The backlight module includes a light guide plate having a lateral side, and a light-emitting unit disposed on the lateral side. The main surrounding wall is recessed to form a cavity that is spacedly below the second support. The light-emitting unit is disposed in the cavity.

In an embodiment, the light guide plate further has a top side connected to a top end of the lateral side. The light-emitting unit includes a flexible circuit board, and a light-emitting diode disposed on a bottom side of the flexible circuit board and corresponding in position to the lateral side of the light guide plate. The liquid crystal display device further comprises an adhesive piece adhered to and disposed between the top side of the light guide plate and the flexible circuit board.

In another embodiment, the light guide plate further has a bottom side connected to a bottom end of the lateral side. The light-emitting unit includes a flexible circuit board abutting against the first support, and a light-emitting diode disposed on a top side of the flexible circuit board and corresponding in position to the lateral side of the light guide plate. The liquid crystal display device further comprises an adhesive piece adhered to and disposed between the bottom side of the light guide plate and the flexible circuit board.

In still another embodiment, the support frame is made by injection molding a plastic material. The light-emitting unit includes a flexible circuit board, and a light-emitting diode disposed on a top side of the flexible circuit board. The liquid crystal display device further comprises a metal frame disposed in the cavity and receiving clampingly the light-emitting unit and the light guide plate.

The metal frame is fixed to the support frame, and includes a vertical plate, a lower clamping plate extending horizontally and inwardly from a bottom end of the vertical plate, and an upper clamping plate extending horizontally and inwardly from a top end of the vertical plate. The lower clamping plate abuts against the first support and engages a bottom side of the flexible circuit board. The upper clamping plate engages a top end of the light-emitting diode and a top side of the light guide plate that is connected to a top end of the lateral side of the light guide plate so that the light-emitting diode is positioned at a location corresponding to the lateral side of the light guide plate.

The support frame is formed with an accommodation groove. The liquid crystal display device further comprises a control circuit board disposed in the accommodation groove, and a flexible transmission circuit connected electrically to the liquid crystal display panel and the control circuit board.

The bottom wall has a bottom face that is recessed to form the accommodation groove. The flexible transmission circuit is configured as a circuit band made by a chip on film (COF) technology. The flexible transmission circuit is bent downward and then inward extending around the support frame to connect with the control circuit board.

The main surrounding wall includes a left wall, a right wall, a front wall and a rear wall. The rear wall includes a positioning structure to position the backlight module. The positioning structure includes a positioning groove and a positioning stud provided in the positioning groove. The backlight module includes an optical film layer that has a projection engaged to the positioning groove and formed with a positioning hole for extension of the positioning stud therethrough.

The liquid crystal display device further comprises at least one double-sided adhesive tape adhering the liquid crystal display panel to one side of the second support.

The main surrounding wall includes a retention portion projecting from the other side of the second support to retain the liquid crystal display panel thereon.

The double-sided adhesive tape includes a pull portion exposed partially from the liquid crystal display panel, and two double-sided adhesive portions adhered to two opposite sides of the pull portion. The double-sided adhesive portions are further adhered to said one side of the second support and the liquid crystal display panel, respectively.

In another embodiment, the liquid crystal display device further comprises two the double-sided adhesive tapes to adhere the liquid crystal display panel to two opposite sides of the second support.

In still another embodiment, the main surrounding wall includes two retention portions projecting respectively from two opposite sides of the second support to retain the liquid crystal display panel thereon.

The liquid crystal display device further comprises an upper casing that covers a periphery of the liquid crystal display panel and that is formed with an opening to expose the liquid crystal display panel.

The support frame further includes an auxiliary surrounding wall extending upwardly from an outer periphery of the bottom wall and surrounding the main surrounding wall. The upper casing is connected to the auxiliary surrounding wall.

The support frame is made of a plastic material and includes two extension plates extending respectively from two opposite sides of the main surrounding wall. The liquid crystal display device further comprises a lower casing that is made of metal, that covers the support frame, and that is coupled to the upper casing, two coupling rods each disposed between the lower casing and a respective one of the extension plates, and two fasteners. Each of the fasteners fixes one of the coupling rods and the respective the extension plate to the lower casing.

The upper casing includes a first coupling portion. The liquid crystal display panel further includes a glass to cover the opening. The glass includes a second coupling portion coupled to the first coupling portion.

The first coupling portion is an inner periphery of the upper casing and defines the opening. The second coupling portion is configured as an annular groove to receive engagingly the inner periphery.

The main surrounding wall further includes a third support spacedly above the second support and having a horizontal support face. The liquid crystal display device further comprises a touch control panel supported on the third support.

Another object of the present disclosure is to provide an electronic equipment having a liquid crystal display device. The liquid crystal display device has a one-piece frame structure that can minimize number of components so that the structure thereof is simple, the assembly time can be reduced, the manufacturing cost associated therewith can be saved, and tolerances among the components can also be reduced.

According to another aspect of disclosure of the present disclosure, an electronic equipment comprises a lower casing, an electronic device, and a liquid crystal display device.

The lower casing defines a mounting space. The electronic device is disposed in the mounting space. The liquid crystal display device is disposed in the mounting space and is coupled electrically to the electronic device. The liquid crystal display device includes a support frame, a backlight module, a liquid crystal display panel, and a touch control panel. The support frame includes a bottom wall, and a main surrounding wall extending upwardly from and formed integrally as one piece with the bottom wall. The bottom wall and the surrounding wall cooperatively define a receiving space. The bottom wall includes a first support disposed in the receiving space. The main surrounding wall includes a second support disposed in the receiving space and spacedly above the first support, and a third support spacedly above the second support. The backlight module is supported on the first support. The liquid crystal display panel is supported on the second support. The touch control panel is supported on the third support.

Through the aforesaid technical means, the advantages and effects of the liquid crystal display device of this disclosure reside in that, through the first and second supports of the one-piece support frame that can accommodate respectively the backlight module and the liquid crystal display panel, the number of components of the liquid crystal display device can be reduced so that the structure thereof is simple, the assembly time can be reduced, the manufacturing cost associated therewith can be saved, and tolerances among the components can also be reduced.

BRIEF DESCRIPTION OF THE DRAWINGS

Other features and advantages of the present disclosure will become apparent in the following detailed description of the embodiments with reference to the accompanying drawings, of which.

DETAILED DESCRIPTION OF THE PREFERRED EMBODIMENTS

Figure 1:
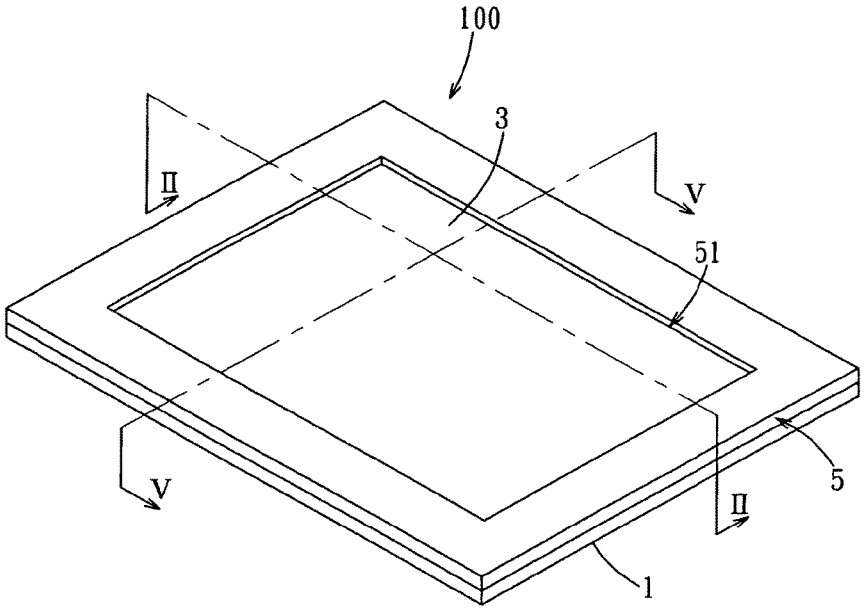
FIG. 1 is a perspective view of a liquid crystal display device according to the first embodiment of the present disclosure.

The above-mentioned and other technical contents, features, and effects of this disclosure will be clearly presented from the following detailed description of ten embodiments in coordination with the reference drawings. Through description of the concrete implementation method, the technical means employed and the effectiveness to achieve the predetermined purposes of the present disclosure will be thoroughly and concretely understood. However, the enclosed drawings are used for reference and description only, and are not used for limiting the present disclosure.

Before this disclosure is described in detail, it should be noted that, in the following description, similar elements are designated by the same reference numerals.

Figure 2:
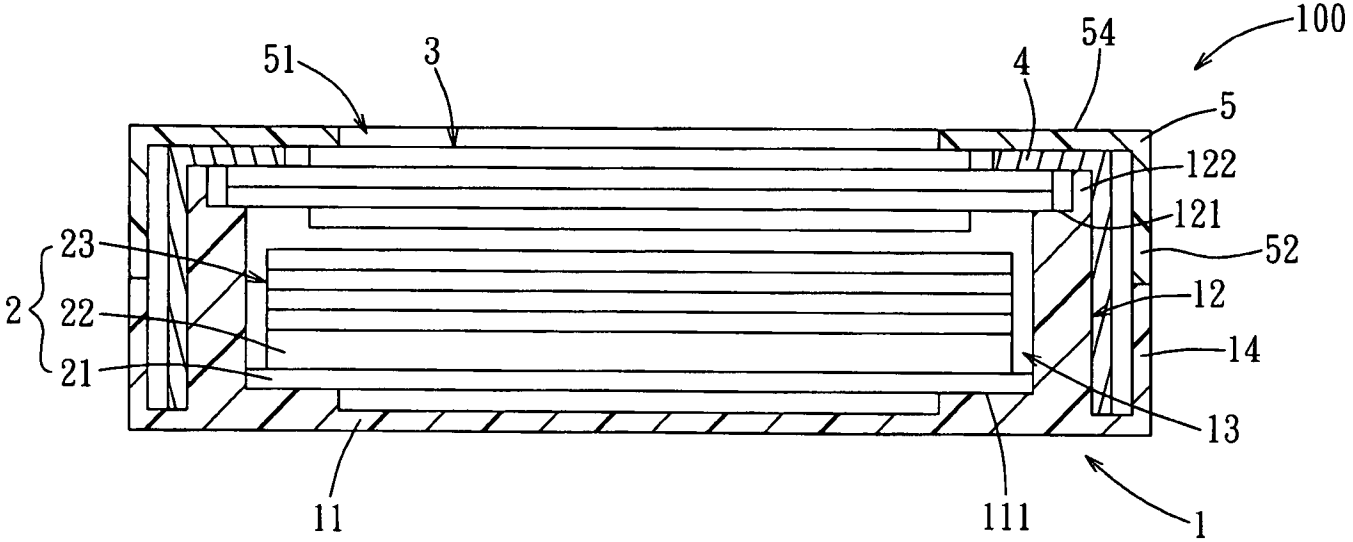
FIG. 2 is a sectional view of the first embodiment taken along line II-II of FIG. 1, illustrating a backlight module and a liquid crystal display panel respectively supported on first and second supports of a support frame.

Referring to FIGS. 1 and 2, a liquid crystal display device 100 according to the first embodiment of the present disclosure is adapted to be applied to a notebook computer as an example for illustration, and is shown to comprise a support frame 1, a backlight module 2 and a liquid crystal display panel 3.

Figure 3:
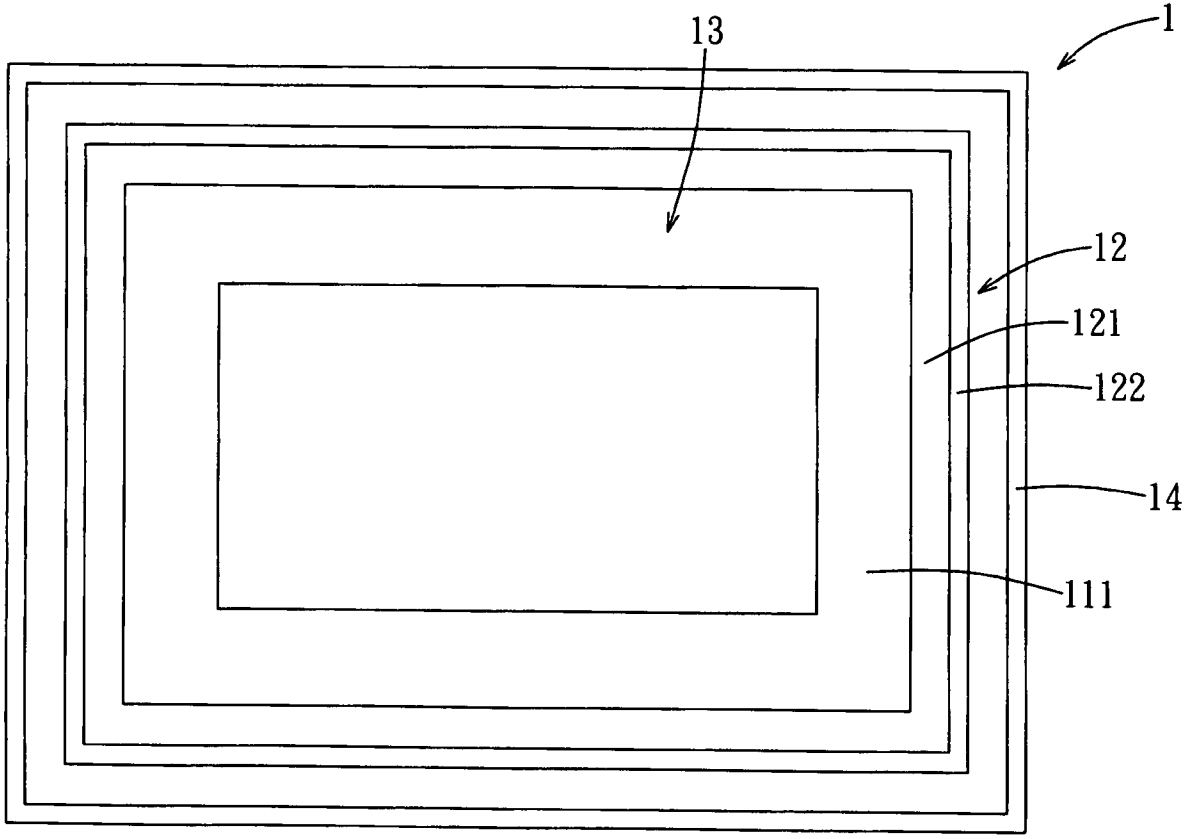
FIG. 3 is a schematic top view of the support frame of the first embodiment.

As shown in FIGS. 2 and 3, the support frame 1 includes a bottom wall 11, and a main surrounding wall 12 extending upwardly from and formed integrally as one piece with the bottom wall 11. The bottom wall 11 and the main surrounding wall 12 cooperatively define a receiving space 13. The bottom wall 11 includes a first support 111 disposed in the receiving space 13. The main surrounding wall 12 includes a second support 121 disposed in the receiving space 13 and spacedly above the first support 111. The backlight module 2 is supported on the first support 111. The liquid crystal display panel 3 is supported on the second support 121 so that the liquid crystal display panel 3 is positioned above the backlight module 2. Through the integrally formed one-piece support frame 1 that can accommodate simultaneously the backlight module 2 and the liquid crystal display panel 3, the number of components of the liquid crystal display device 100 can be reduced so that the liquid crystal display device 100 has a simple structure. Because of this, the assembly time and the manufacturing costs thereof can be reduced. Further, accumulated tolerance of the components can also be reduced.

A detailed structure of the liquid crystal display device 100 will be described hereinbelow.

With reference to FIGS. 2 and 3, the backlight module 2 includes a reflective plate 21, a light guide plate 22 stacked above the reflective plate 21, and an optical film layer 23 stacked above the light guide plate 22. The optical film layer 23 includes a lower diffusion plate, a first prism plate, a second prism plate, and an upper diffusion plate stacked one above the other. Since the function of each optical film of the optical film layer 23 is well known in the art, a detailed description thereof is dispensed herewith. Further, the assembly of the optical film layer 23 is not limited to the aforesaid disclosure. In this embodiment, the first support 111 is formed on a top face of the bottom wall 11. The second support 121 is formed on and extends along the entire length of a top face of the main surrounding wall 12. Each of the first and second supports 111, 121 has a horizontal support face. Because the reflective plate 21 abuts against the first support 111 and the liquid crystal display panel 3 abuts against the second support 121, the backlight module 2 and the liquid crystal display panel 3 will not be slanting relative to the support frame when assembled thereon. Further, because the integrally formed one-piece support frame 1 can simultaneously accommodate the backlight module 2 and the liquid crystal display panel 3, the accumulated tolerance among the components of the backlight module 2 and the liquid crystal display panel 3 can be reduced.

The support frame 1 is made by injection molding a plastic material. The main surrounding wall 12 further includes an annular projection 122 projecting upwardly from the second support 121. The liquid crystal display device 100 further comprises a positioning element 4 in the form of a frame. The positioning element 4 covers the main surrounding wall 12, and abuts against the projection 122 and the liquid crystal display panel 3. The positioning element 4 is fixed to the projection 122 and the liquid crystal display panel 3 by using adhesive or a screw fastening method. Through this, the liquid crystal display panel 3 can be stably positioned to the main surrounding wall 12. The positioning element 4 can be made of Mylar, aluminum foil, or metal. In this embodiment, the positioning element 4 is made of metal so as to provide an anti-EMI (anti-electromagnetic interference) effect.

Figure 4:
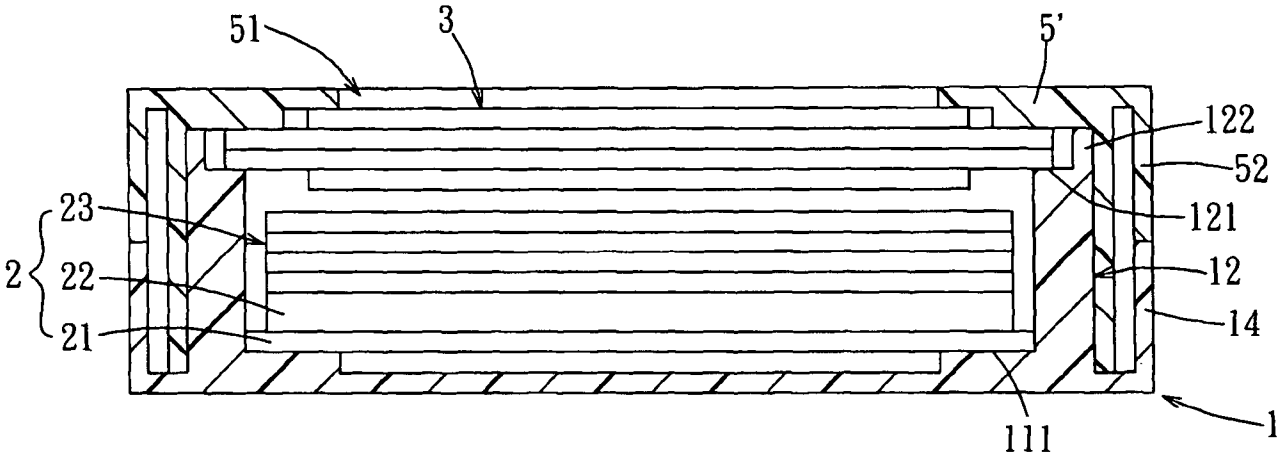
FIG. 4 is a sectional view of the first embodiment, illustrating an alternative form of an upper casing.

The support frame 1 further includes an auxiliary surrounding wall 14 extending upwardly and integrally from an outer periphery of the bottom wall 11 and surrounding an outer periphery of the main surrounding wall 12. The liquid crystal display device 100 further comprises an upper casing 5 covering a periphery of the liquid crystal display panel 3. The upper casing 5 is made by injection molding a plastic material. The upper casing 5 has an upper wall 54 formed with an opening 51 for exposure of the liquid crystal display panel 3, and an outer peripheral wall 52 extending downwardly from an outer periphery of the upper wall 54. The outer peripheral wall 52 is connected to the auxiliary surrounding wall 14 by using a hook-and-groove interlocking means or a screw fastening method. Through such a connection, the upper casing 5 can be stably fixed to the support frame 1. It should be noted that the upper casing 5 of this embodiment may be configured as that shown in FIG. 4. That is, the upper casing 5' is formed integrally as one piece with the positioning element 4 shown in FIG. 2. The upper casing 5' can similarly achieve the effect made by the upper casing 5 and the positioning element 4. Thus, the number of components of the liquid crystal display device 100 can be further reduced.

Figure 5:
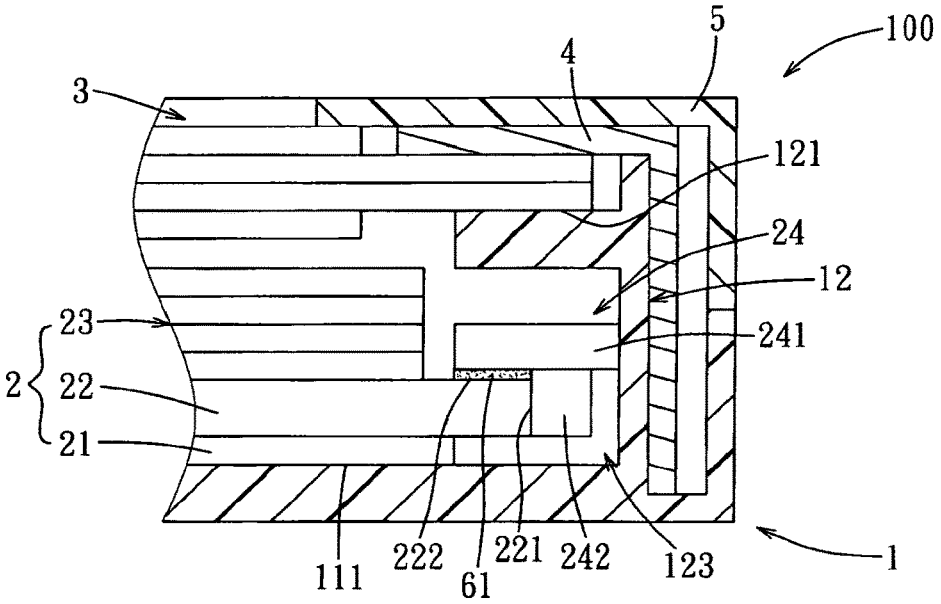
FIG. 5 is a fragmentary sectional view of the first embodiment taken along line V-V of FIG. 1.

FIG. 5 is a fragmentary sectional view of this embodiment taken along line V-V of FIG. 1. As shown in FIG. 5, the main surrounding wall 12 is recessed to form a cavity 123 that is spacedly below the second support 121. The backlight module 2 further includes a light-emitting unit 24 disposed in the cavity 123 and supplying light to the light guide plate 22. Concretely speaking, the light guide plate 22 has a lateral side 221, and a top side 222 connected to a top end of the lateral side 221. The light-emitting unit 24 includes a flexible circuit board 241 disposed on the top side 222 of the light guide plate 22, and a light-emitting diode 242 disposed on a bottom side of the flexible circuit board 241 and corresponding in position to the lateral side 221 of the light guide plate 22. Through this configuration, when the support frame 1 is deformed caused by an external force, the light-emitting unit 24 can be prevented from being displaced, so that light generated by the light-emitting diode 242 can be uniformly emitted to the light guide plate 22 through the lateral side 221 thereof.

Further, the liquid crystal display device further comprises an adhesive piece 61. The adhesive piece 61 is configured as a double-sided adhesive tape adhered to and disposed between the top side 222 of the light guide plate 22 and the bottom side of the flexible circuit board 241, so that the flexible circuit board 241 can be stably positioned to the top side 222 of the light guide plate 22.

Figure 6:
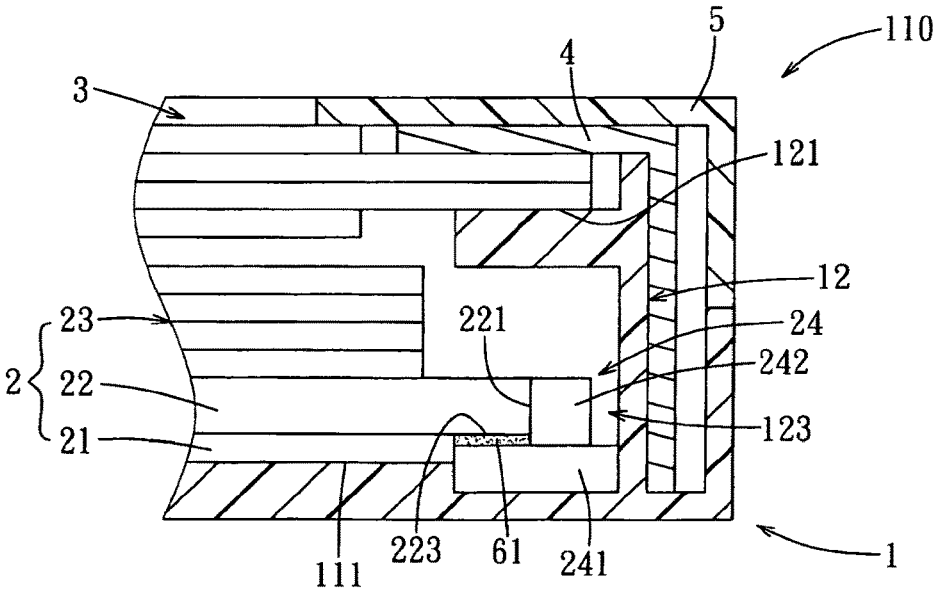
FIG. 6 is a fragmentary sectional view of a liquid crystal display device according to the second embodiment of the present disclosure.

Referring to FIG. 6, a liquid crystal display device 110 according to the second embodiment of this disclosure has an overall structure similar to that of the first embodiment. However, in this embodiment, the light guide plate 22 further has a bottom side 223 connected to a bottom end of the lateral side 221, the flexible circuit board 241 abuts against the first support 111, and the light-emitting diode 242 is disposed on a top side of the flexible circuit board 241 and corresponds in position to the lateral side 221 of the light guide plate 22. The adhesive piece 61 is adhered to and disposed between the bottom side 223 of the light guide plate 22 and the top side of the flexible circuit board 241, so that the light-emitting diode 242 can be stably positioned at a location corresponding to the lateral side 221 of the light guide plate 22.

Figure 7:
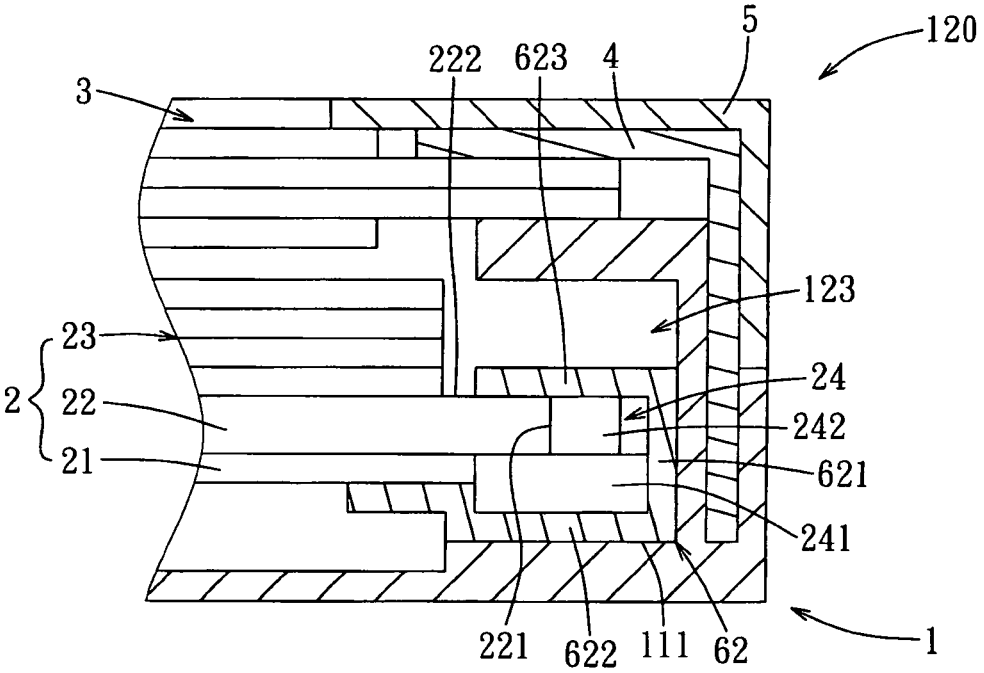
FIG. 7 is a fragmentary sectional view of a liquid crystal display device according to the third embodiment of the present disclosure.

Referring to FIG. 7, a liquid crystal display device 120 according to the third embodiment of this disclosure has an overall structure similar to that of the first embodiment. However, in this embodiment, because the support frame 1 is made by injection molding a plastic material so that the strength thereof is weak, to enhance the strength of the support frame 1, a metal frame 62 is disposed in the cavity 123, and receives clampingly the light-emitting unit 24 and the light guide plate 22. Because the metal frame 62 can enhance the strength of the support frame 1 and protect the light-emitting unit 24, when the support frame 1 is deformed caused by an external force, the light-emitting unit 24 can be prevented from being displaced.

Further, to enhance flatness of the first support 111 so that the light-emitting diode 242 cannot be slantingly disposed when assembled to the support frame 1, the metal frame 62 is fixed to the support frame 1 by, for example, a screw fastening method. The metal frame 62 has a substantially U-shaped cross section, and includes a vertical plate 621, a lower clamping plate 622 extending horizontally from a bottom end of the vertical plate 621, and an upper clamping plate 623 extending horizontally from a top end of the vertical plate 621. The lower clamping plate 622 abuts against the first support 111 and engages the bottom side of the flexible circuit board 241. The upper clamping plate 623 engages a top end of the light-emitting diode 242 and the top side 222 of the light guide plate 22. Through the upper and lower clamping plates 623, 622 that cooperatively clamp therebetween the light-emitting unit 24 and the light guide plate 22, the light-emitting diode 242 can be positioned at a location corresponding to the lateral side 221 of the light guide plate 22. Hence, light generated by the light-emitting diode 242 can be uniformly emitted to the light guide plate 22 through the lateral side 221 thereof.

Figure 8:
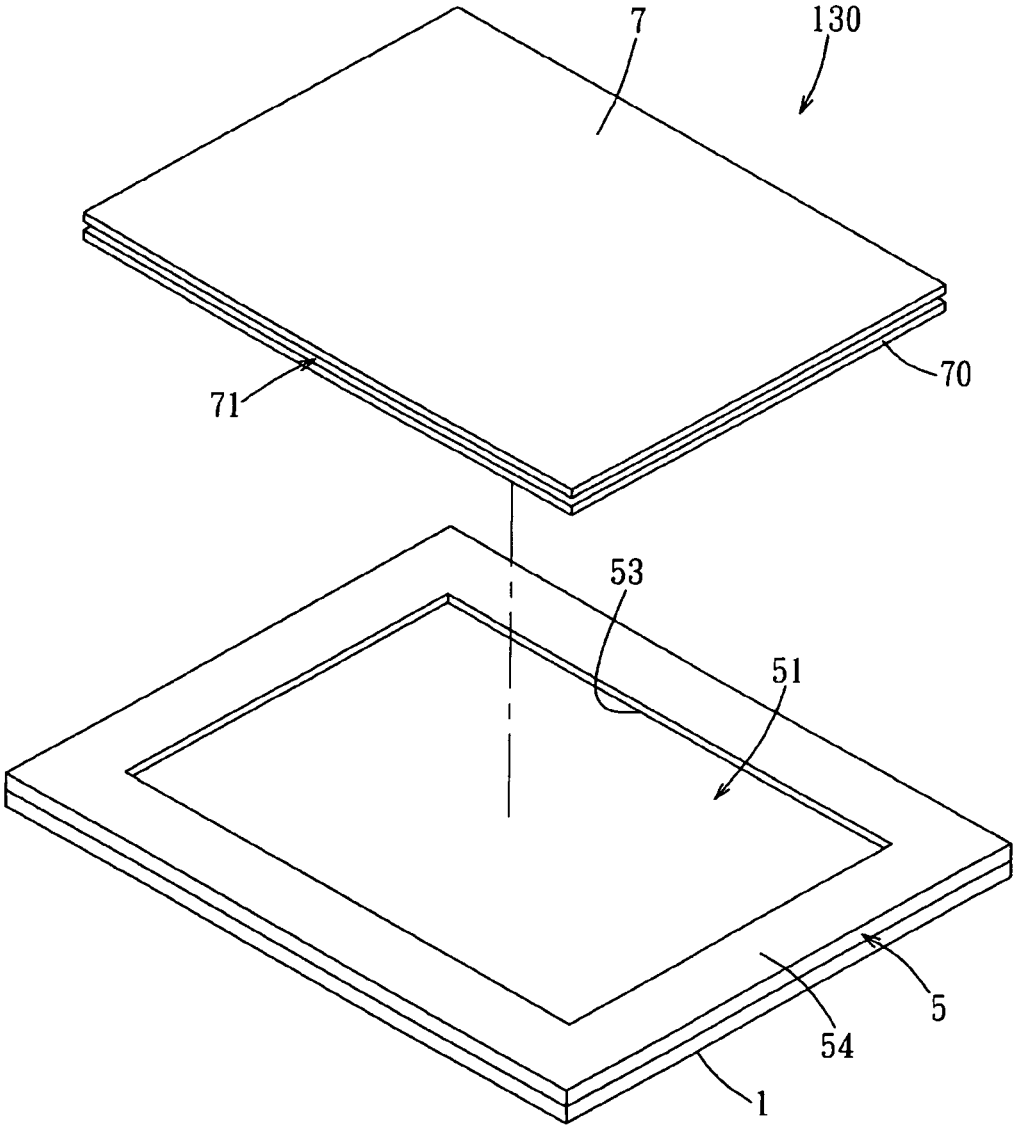
FIG. 8 is a perspective view of a liquid crystal display device according to the fourth embodiment of the present disclosure, illustrating how a glass is assembled to an upper casing.
Figure 9:
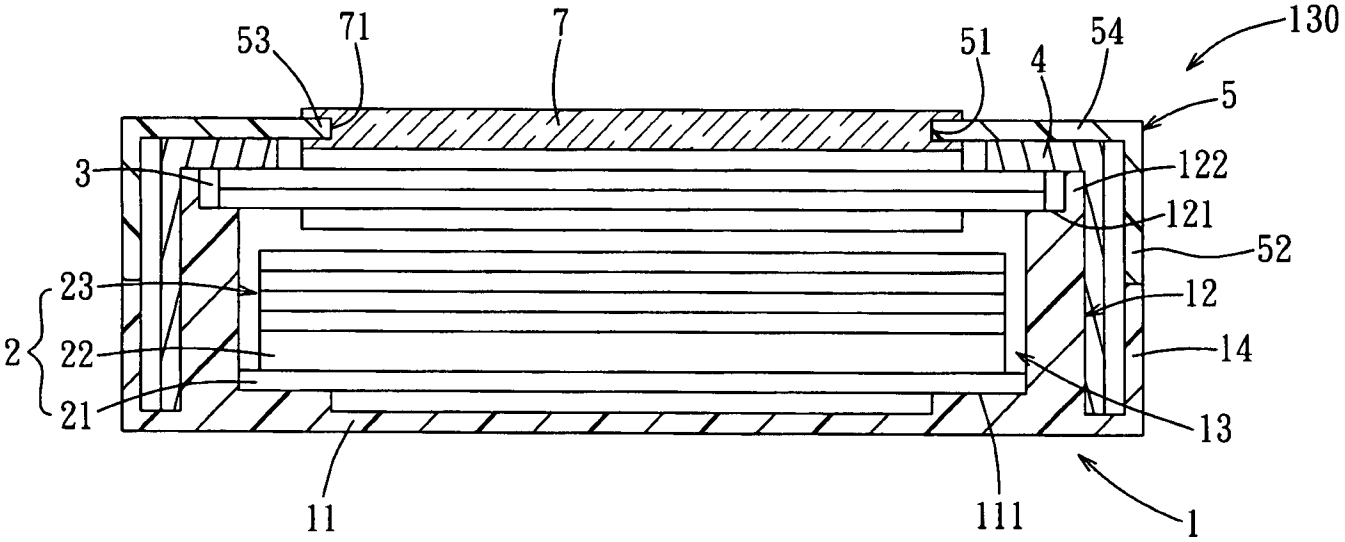
FIG. 9 is a sectional view of the fourth embodiment, illustrating a first coupling portion of the upper casing is coupled to a second coupling portion of the glass.

Referring to FIGS. 8 and 9, a liquid crystal display device 130 according to the fourth embodiment of this disclosure has an overall structure similar to that of the first embodiment. However, in this embodiment, the liquid crystal display device 130 further comprises a glass 7 to cover the opening 51. The glass 7 is a tempered glass.

The upper casing 5 includes a first coupling portion 53. The glass 7 includes a second coupling portion 71 coupled to the first coupling portion 53. Through the interconnection of the first and second coupling portions 53, 71, the glass 7 can be fixed to the upper casing 5 so as to cover the opening 51. In this embodiment, the first coupling portion 53 is an inner periphery of the upper wall 54 and defines the opening 51. The second coupling portion 71 is configured as an annular groove that extends inwardly from an outer peripheral face 70 of the glass 7 and receiving engagingly the inner periphery or the first coupling portion 53. The connection between the first and second coupling portions 53, 71 can be accomplished using the below two methods.

In the first method, the glass 7 is cooled to shrink its volume, after which the glass 7 is brought to a working environment having a room temperature. The glass 7 is then inserted into the opening 51 of the upper casing 5 aligning the second coupling portion 71 with the first coupling portion 53. After the glass 7 is placed at room temperature for a period of time, the glass 7 will return to a room temperature condition and the volume thereof will expand. Hence, the second coupling portion 71 is coupled fixedly to the first coupling portion 53.

In the second method, the upper casing 5 is heated to expand its volume, after which the upper casing 5 is brought to a working environment having a room temperature. The glass 7 is then inserted into the opening 51 of the upper casing 5 aligning the second coupling portion 71 with the first coupling portion 53. After the upper casing 5 is placed at room temperature for a period of time, the upper casing 5 will return to a room temperature condition and the volume thereof will shrink. Hence, the second coupling portion 71 is coupled fixedly to the first coupling portion 53.

In both methods, because the second coupling portion 71 can be coupled fixedly to the first coupling portion 53, the glass 7 can be assembled fixedly and stably to the upper casing 5. Hence, the structural strength of the upper casing 5 can be enhanced. Moreover, the glass 7 can be configured to partly or fully cover the upper wall 54, so that the liquid crystal display device 130 can exhibit a frameless visual effect. It should be noted that the connection between the first and second coupling portions 53, 71 is not limited to the aforesaid disclosures.

Figure 10:
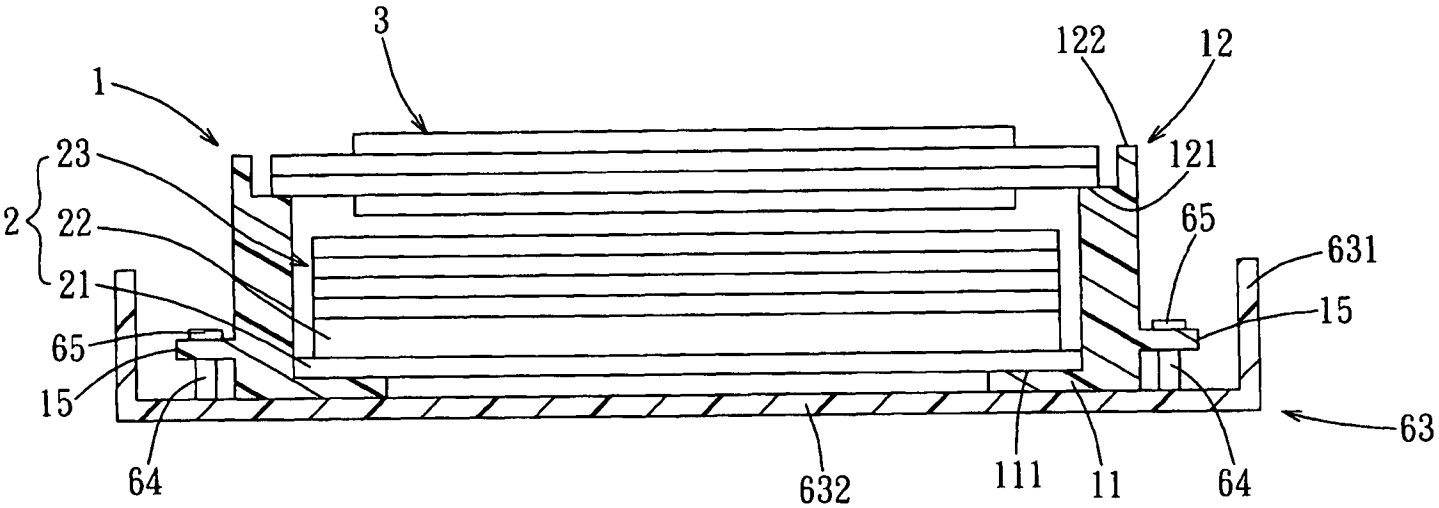
FIG. 10 is a sectional view of a liquid crystal display device according to the fifth embodiment of the present disclosure, but without an upper casing.
Figure 11:
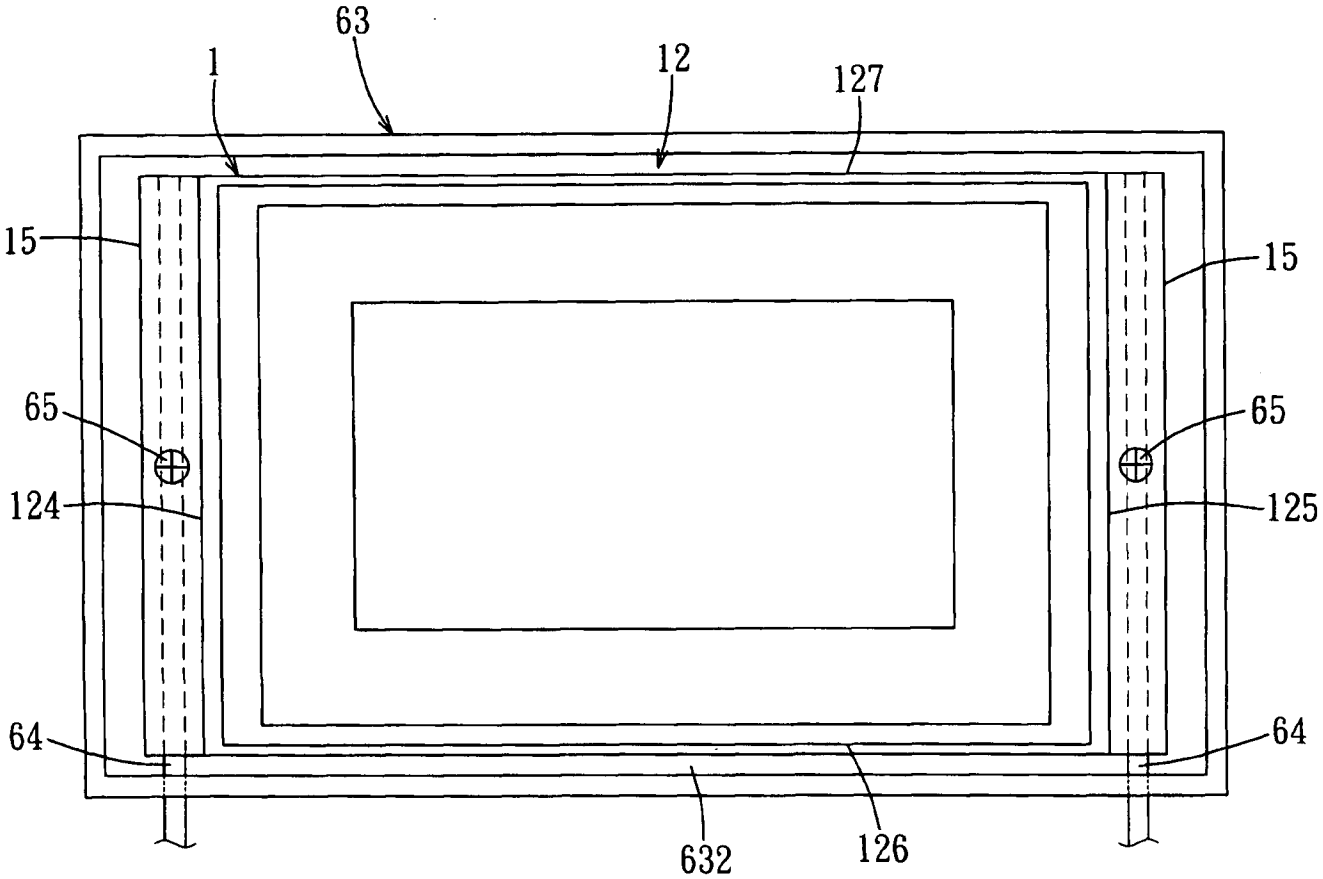
FIG. 11 is a schematic top view of a support frame of the fifth embodiment.
Figure 12:
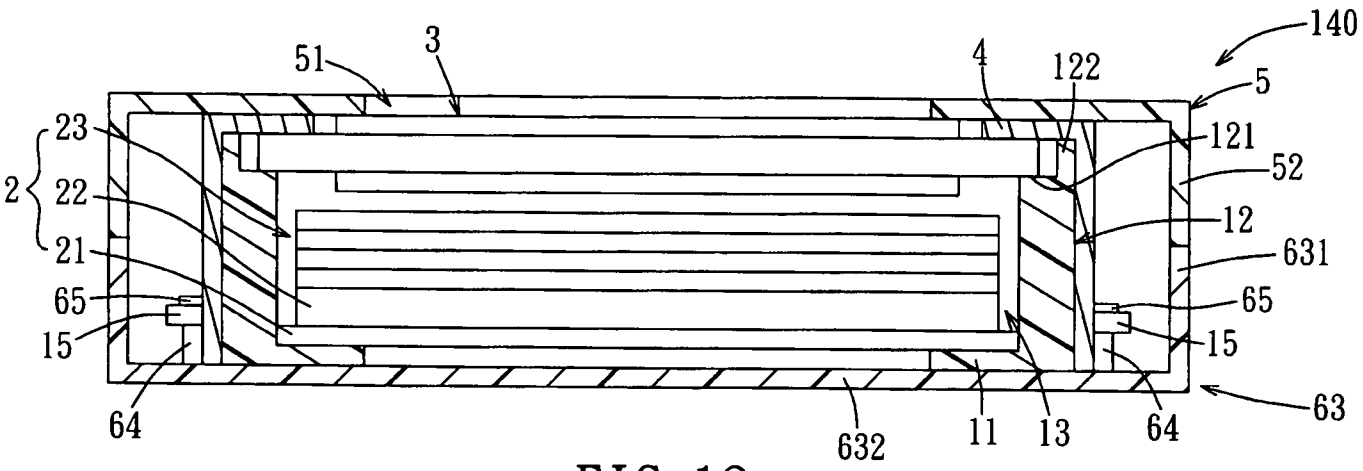
FIG. 12 is another sectional view of the fifth embodiment, illustrating the upper casing being coupled to an outer surrounding wall of a lower casing.

Referring to FIGS. 10, 11 and 12, a liquid crystal display device 140 according to the fifth embodiment of this disclosure has an overall structure similar to that of the first embodiment. However, in this embodiment, the main surrounding wall 12 of the support frame 1 includes a left wall 124, a right wall 125, a front wall 126 connected to front ends of the left and right walls 124, 125, and a rear wall 127 connected to rear ends of the left and right walls 124, 125. The support frame 1 further includes two elongated extension plates 15 extending respectively and outwardly from outer sides of the left and right walls 124, 125. The liquid crystal display device 140 further comprises a lower casing 63, two coupling rods 64, and two fasteners 65. The lower casing 63 covers a bottom side of the support frame 1, and is coupled to the upper casing 5. In this embodiment, the upper casing 5 and the lower casing 63 are made of metal. An outer peripheral wall 631 of the lower casing 63 and the outer peripheral wall 52 of the upper casing 5 are coupled fixedly to each other by using a hook-and-groove interlocking means or a screw fastening method. However, the connection between the outer peripheral walls 631, 52 is not limited to the aforesaid disclosures.

Figure 13:
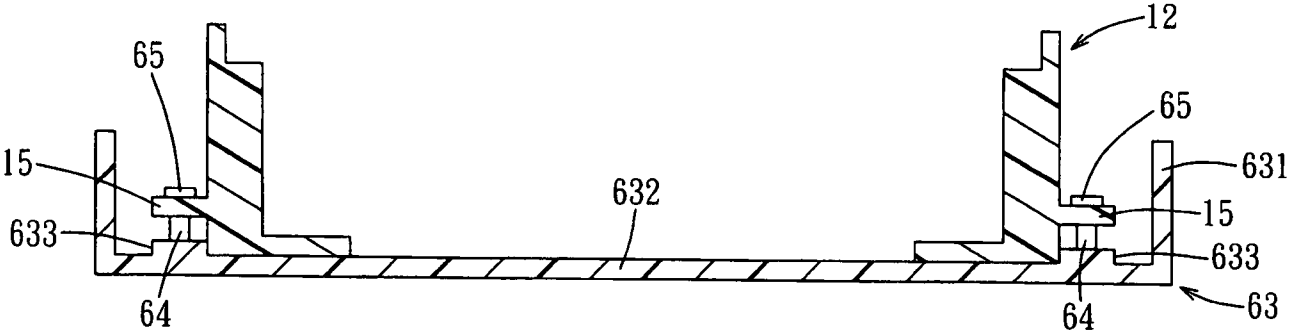
FIG. 13 is a still another sectional view of the fifth embodiment, illustrating how each fastener fixes an extension plate and a coupling rod to a base plate of the lower casing.

The two coupling rods 64 are made of metal and are connected respectively to two hinges (not shown) of the notebook computer. The hinges are disposed in a system housing (not shown) of the notebook computer, so that the liquid crystal display device 140 can rotate relative to the system housing through the hinges. Each of the coupling rods 64 is elongated, and is disposed between a base plate 632 of the lower casing 63 and a respective extension plate 15. Each fastener 65 is configured as a screw that extends through one of the extension plates 15 and the respective coupling rod 64 and that engages threadedly the base plate 632, so that each extension plate 15 and the respective coupling rod 64 are fixed to the base plate 632. By fixing the coupling rods 64 between the base plate 632 and the respective extension plates 15, the structural strength among the hinges, the support frame 1 and the lower casing 63 can be enhanced. Hence, the liquid crystal display device 140 can rotate smoothly relative to the system housing through the hinges. Further, as shown in FIG. 13, the base plate 632 of the lower casing 63 can be provided with two internally threaded studs 633, so that the screws or fasteners 65 can be threaded respectively to threaded holes (not shown) in the studs 633. In this case, there is no need to form threaded holes in the base plate 632 for threaded engagement with the fasteners 65. The internally threaded studs 633 can be formed with deeper threaded holes so as to enhance the fastening strength of the fasteners 65 when the fasteners 65 are engaged to the studs 633.

Figure 14:
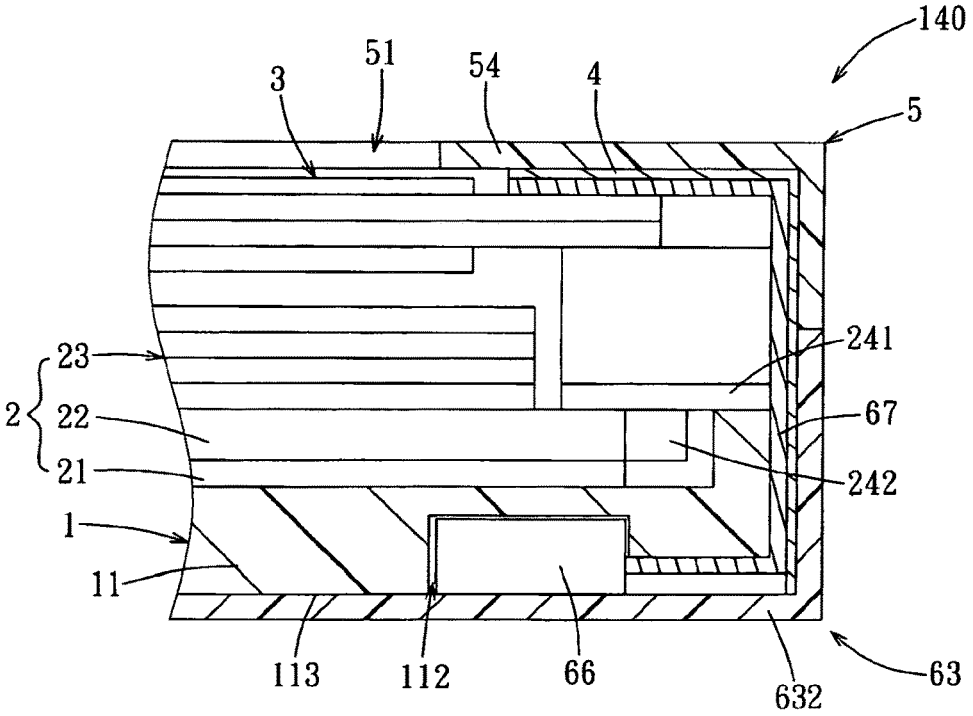
FIG. 14 is a fragmentary sectional view of the fifth embodiment, illustrating a control circuit board being disposed in an accommodation groove of a bottom wall.

As shown in FIG. 14, which is a fragmentary sectional side view of the liquid crystal display device 140, to effectively reduce the width of the upper wall 54 of the upper casing 5 so that the liquid crystal display device 140 has a narrow upper frame, the below structural design is employed.

The support frame 1 is formed with an accommodation groove 112. The liquid crystal display device 140 further comprises a control circuit board 66 disposed in the accommodation groove 112, and a flexible transmission circuit 67 connected electrically to the liquid crystal display panel 3 and the control circuit board 66. Through the presence of the accommodation groove 112 that accommodates the control circuit board 66, the control circuit board 66 and the flexible transmission circuit 67 can be disposed between the upper casing 5 and the lower casing 63. Either the upper casing 5 or the lower casing 63 does not need an additional structure to receive the control circuit board 66. Hence, the width of the upper wall 54 can be reduced, and the liquid crystal display device 140 can have a narrow upper frame.

Concretely speaking, the bottom wall 11 of the support frame 1 has a bottom face 113 that is recessed to form the accommodation groove 112, so that the control circuit board 66 can be received inside the bottom wall 11. The flexible transmission circuit 67 is configured as a circuit band made by a chip on film (COF) technology and transmitting a control signal generated by the control circuit board 66 to the liquid crystal display panel 3. The flexible transmission circuit 67 is bent downward and then inward extending around the support frame 1 to connect with the control circuit board 66. Through this, the flexible transmission circuit 67 can be positioned between the support frame 1 and the positioning element 4.

Figure 15:
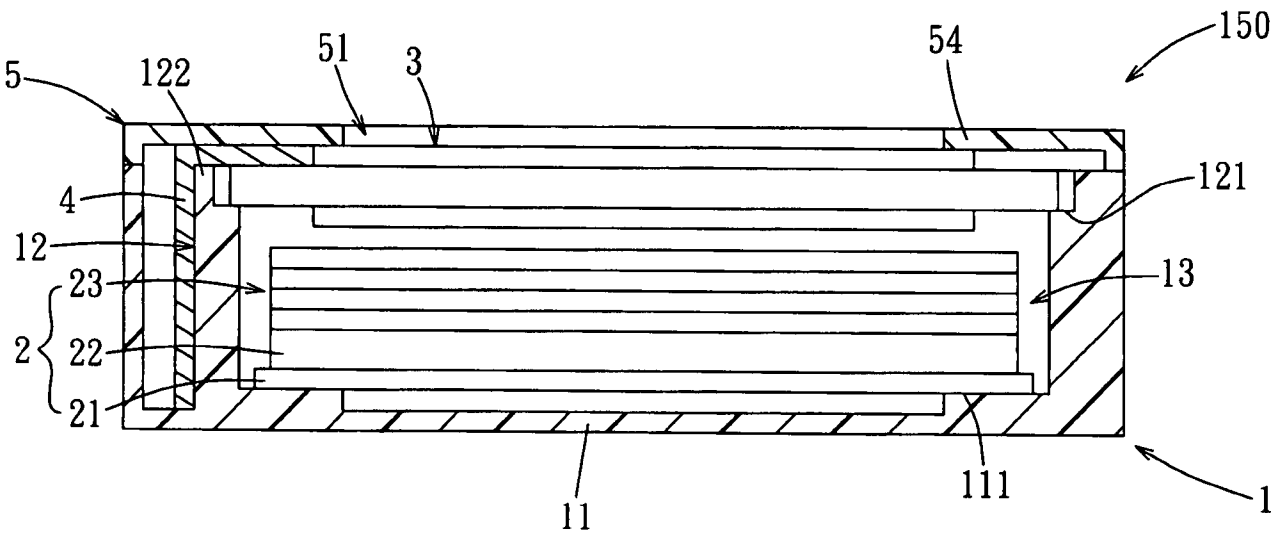
FIG. 15 is a sectional view of a liquid crystal display device according to the sixth embodiment of the present disclosure.
Figure 16:
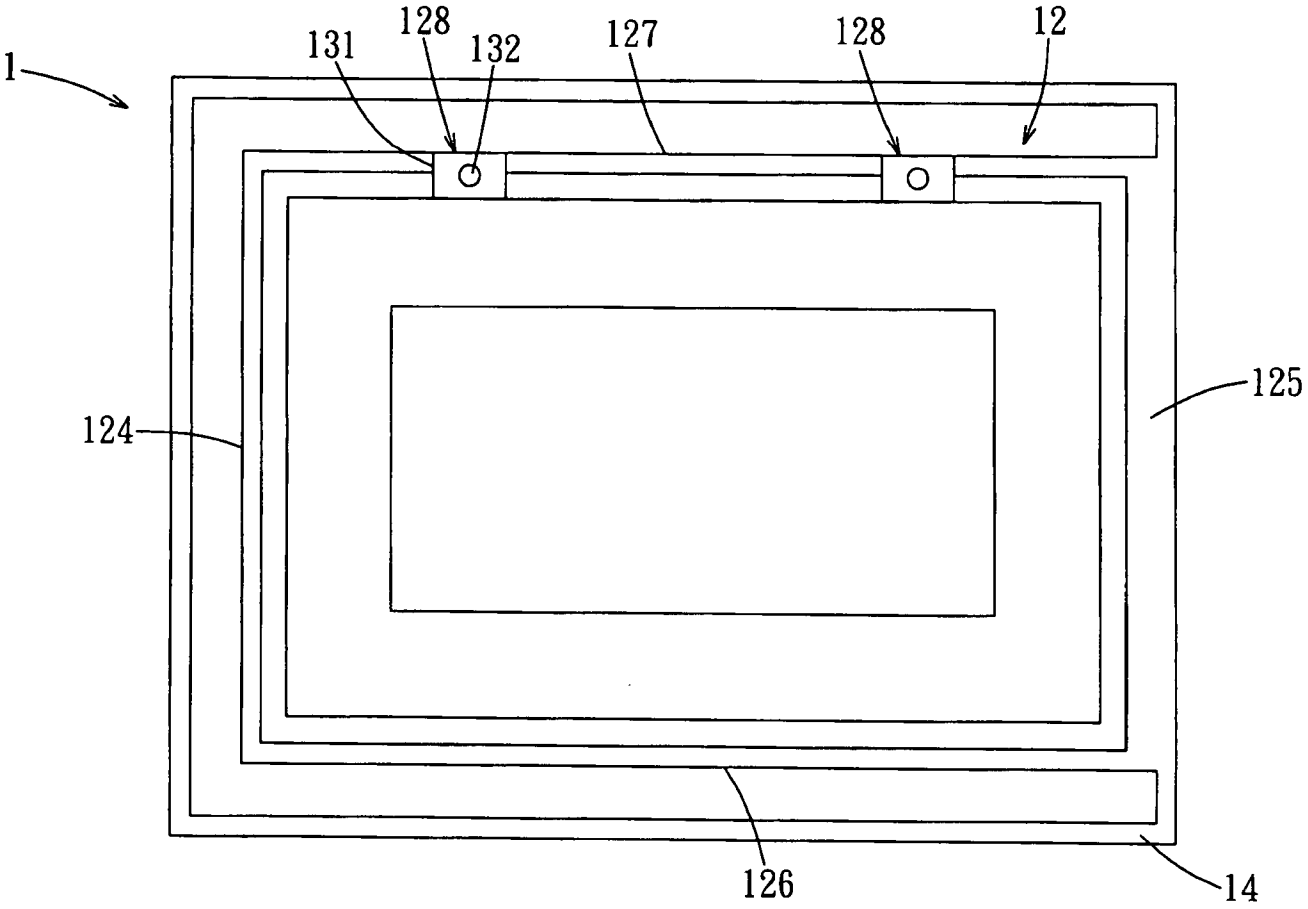
FIG. 16 is a schematic top view of a support frame of the sixth embodiment.
Figure 17:
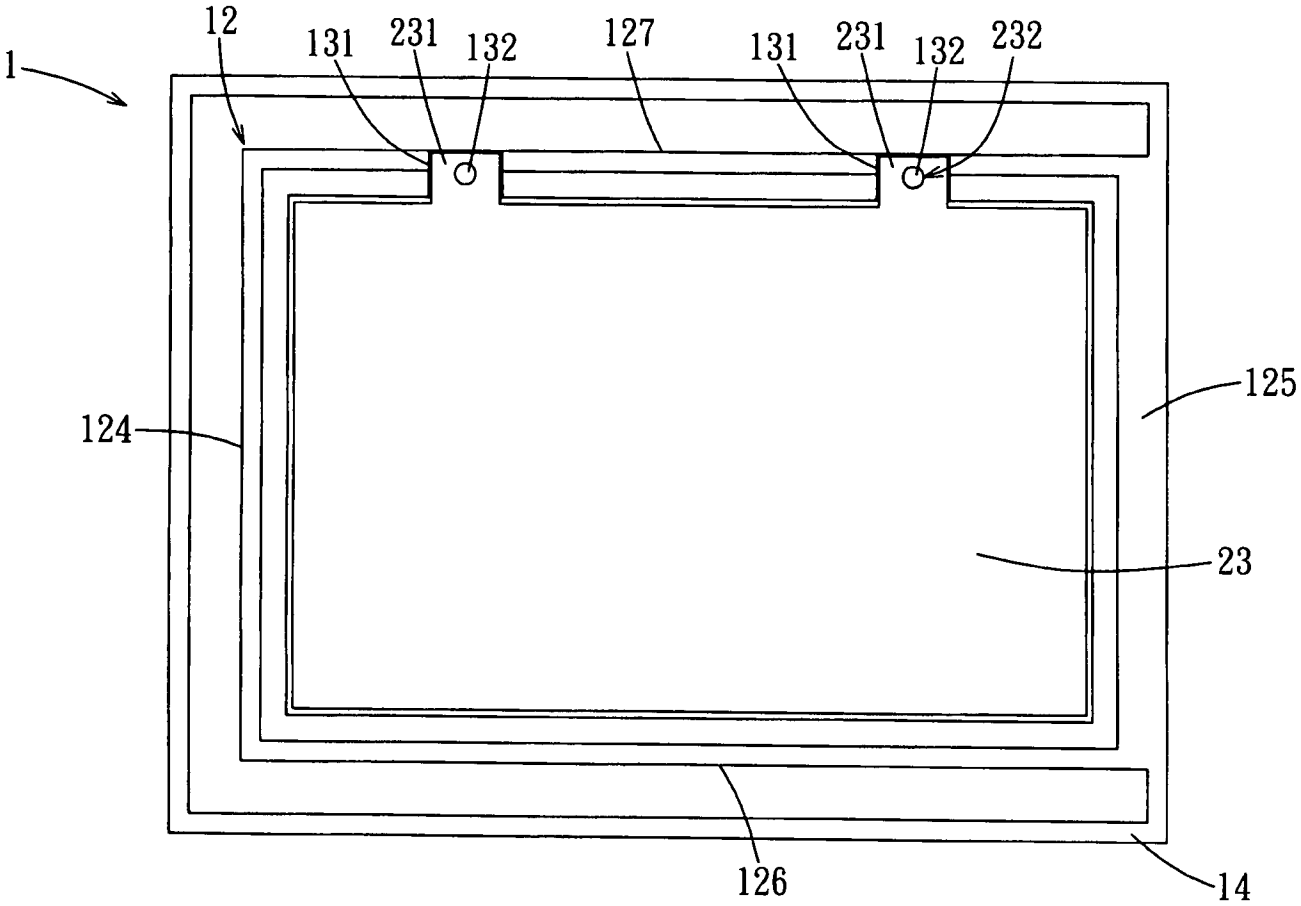
FIG. 17 is a view similar to FIG. 16, but illustrating how an optical film layer is connected to the support frame.

Referring to FIGS. 15 to 17, a liquid crystal display device 150 according to the sixth embodiment of this disclosure has an overall structure similar to that of the first embodiment. However, to effectively reduce the width of the upper wall 54 of the upper casing 5 so that the liquid crystal display device 150 can have a narrow upper frame, the liquid crystal display device 150 of this embodiment can be realized through the below structural design.

In this embodiment, the rear wall 127 of the main surrounding wall 12 includes two positioning structures 128 spaced apart in a left-right direction to position the backlight module 2 so that the backlight module 2 is assembled to the support frame 1 in a correct direction of assembly. Further, the positioning structures 128 can position the backlight module 2 in the receiving space 13.

Concretely speaking, each of the positioning structures 128 includes a positioning groove 131 and a positioning stud 132 provided in the positioning groove 131. The optical film layer 23 of the backlight module 2 includes two projections 231 each having a shape matching that of the positioning groove 131 so as to engage with the same. Each of the projections 231 is formed with a positioning hole 232 having a shape matching that of the positioning stud 132. When each projection 231 engages the respective positioning groove 131, the positioning stud 132 of each positioning structure 128 extends into the positioning hole 232 of the respective projection 231 simultaneously, so that the optical film layer 23 of the backlight module 2 can be stably positioned in the receiving space 13 and will not rocked. By providing the positioning structures 128 on the rear wall 127 of the main surrounding wall 12, the size of the left and right sides of each of the support frame 1 and the upper wall 54 of the upper casing 5 can be effectively reduced. For example, as shown in FIG. 16, a gap between the right wall 125 and the auxiliary surrounding wall 14 can be omitted, so that the liquid crystal display device 150 can have a narrow frame.

Figure 18:
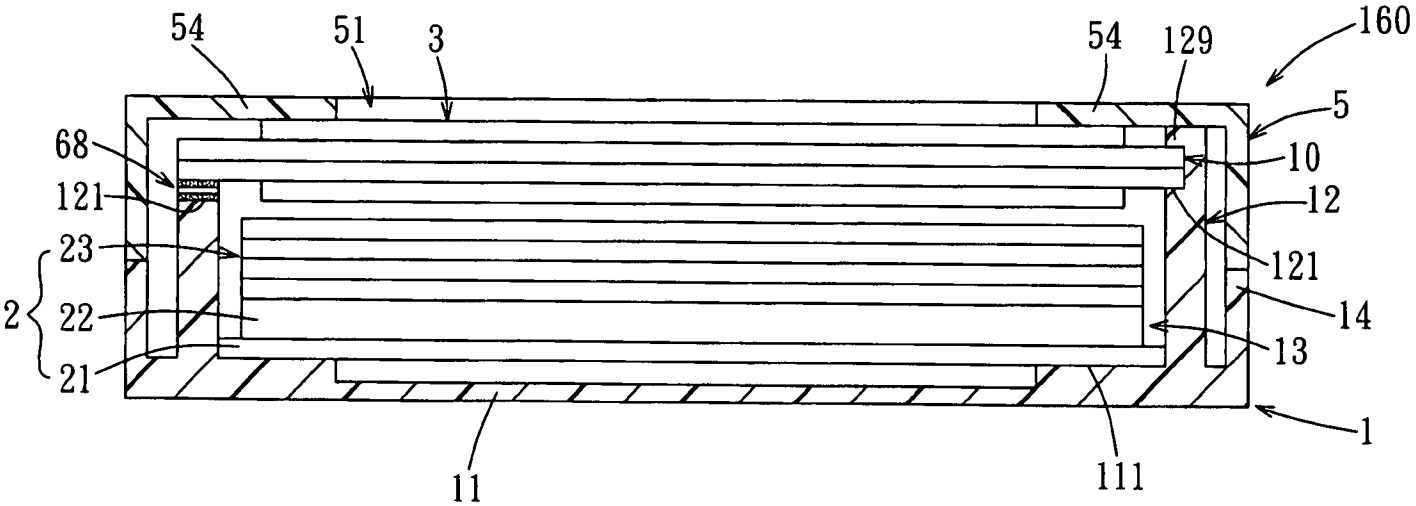
FIG. 18 is a sectional view of a liquid crystal display device according to the seventh embodiment of the present disclosure.
Figure 19:
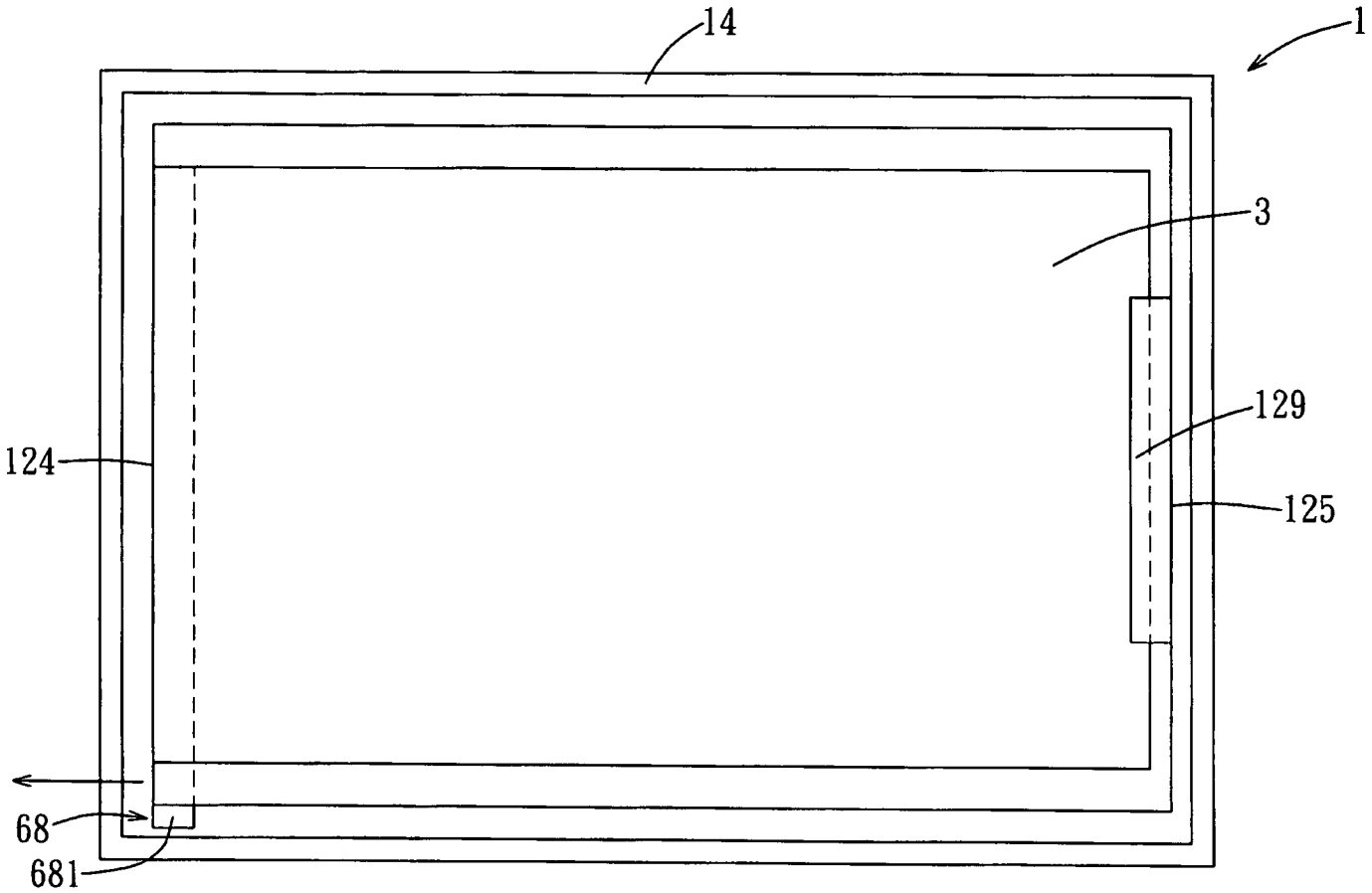
FIG. 19 is a schematic top view of a support frame of the seventh embodiment.
Figure 20:
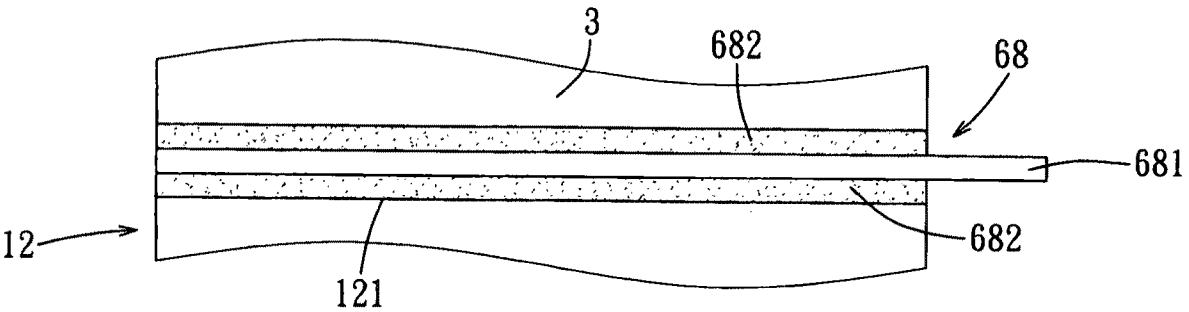
FIG. 20 is a fragmentary enlarged schematic view of the seventh embodiment, illustrating a double-sided adhesive tape adhered to and disposed between a liquid crystal display panel and a second support.

Referring to FIGS. 18 to 20, a liquid crystal display device 160 according to the seventh embodiment of this disclosure has an overall structure similar to that of the first embodiment. However, to effectively reduce the width of the upper wall 54 of the upper casing 5 so that the liquid crystal display device 160 can have a narrow upper frame, the liquid crystal display device 160 of this embodiment can be realized through the below structural design.

In this embodiment, the liquid crystal display device 160 further comprises a double-sided adhesive tape 68 adhering the liquid crystal display panel 3 to one side of the second support 121. The main surrounding wall 12 further includes a retention portion 129 projecting from the other side of the second support 121. The double-sided adhesive tape 68 and the retention portion 129 are opposite to each other. When the liquid crystal display panel 3 is assembled on the support frame 1, the liquid crystal display panel 3 is placed on the second support 121 such that the double-sided adhesive tape 68 adheres one side of the liquid crystal display panel 3 and the retention portion 129 retains the other side of the liquid crystal display panel 3 in a retention hole 10 (see FIG. 18) defined by the retention portion 129 and the second support 121. Hence, the liquid crystal display panel 3 can be fixed stably on the second support 121 of the support frame 1. Through the aforesaid configuration, the positioning element 4 shown in FIG. 2 can be dispensed herewith, and the support frame 1 can omit a space for receiving the positioning element 4. Hence, the width of each of the support frame 1 and the upper wall 54 of the upper casing 5 can be effectively reduced, so that the liquid crystal display device 160 can have a narrow frame.

Figure 21:
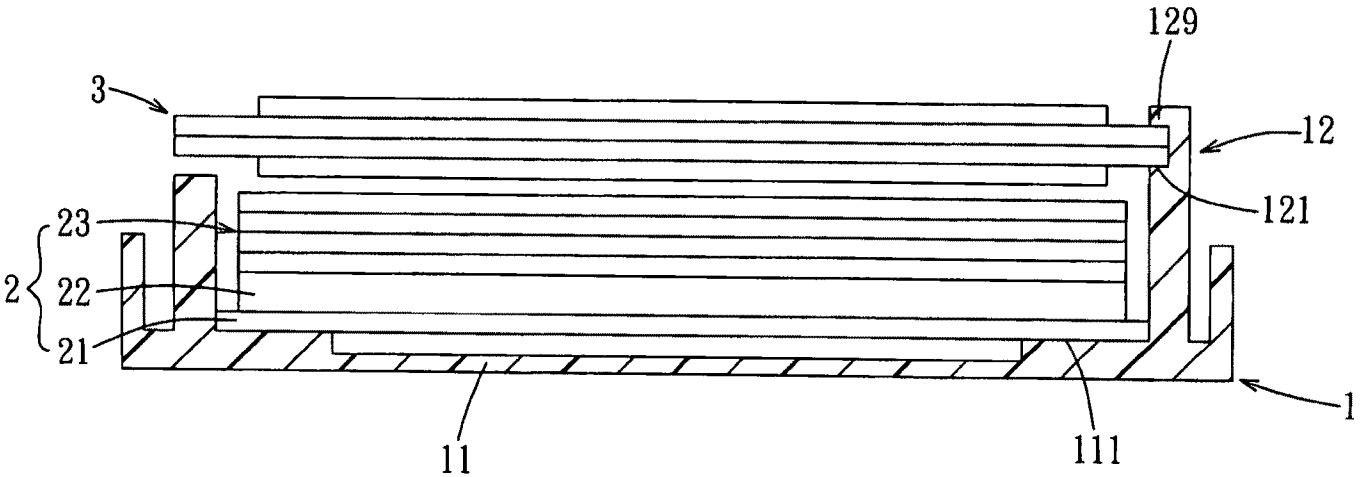
FIG. 21 is another sectional view of the seventh embodiment, illustrating the double-sided adhesive tape being removed the liquid crystal display panel and the second support.

With reference to FIGS. 19 to 21, further, in considering rework for the liquid crystal display device 160, in this embodiment, the double-sided adhesive tape 68 includes a pull portion 681, and two double-sided adhesive tape portions 682 adhered respectively to two opposite sides of the pull portion 681. The pull portion 681 is made of PET material. The double-sided adhesive tape portions 682 are further adhered to the second support 112 at one side of the main surrounding wall 12 and the liquid crystal display panel 3, respectively. One end of the pull portion 681 is exposed from one side of the liquid crystal display panel 3, as best shown in FIG. 19. When it is desired to disassemble the liquid crystal display device 160 for a rework operation, the upper casing 5 is first removed from the support frame 1. Afterwards, the exposed end of the pull portion 681 is pulled out in the direction of an arrow shown in FIG. 19 so as to separate the double-sided adhesive tape portions 682 from the second support 112 and the liquid crystal display panel 3, respectively. Subsequently, the liquid crystal display panel 3 can be disengaged from the retention portion 129. Because disassembly is very simple and convenient, the time of disassembly can be shortened.

Figure 22:
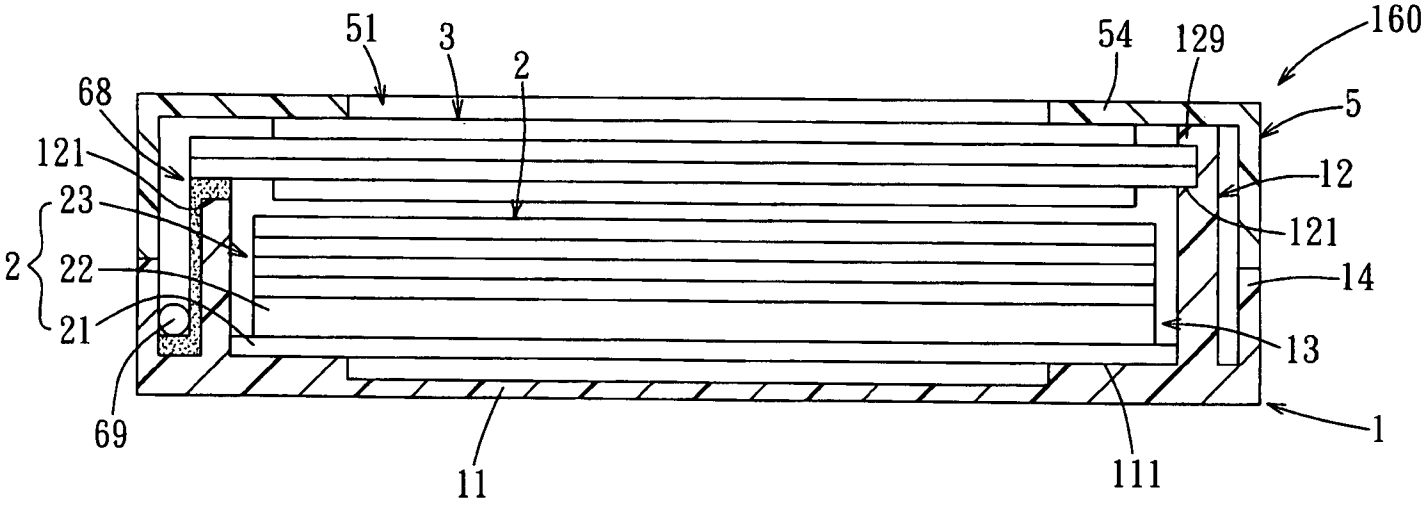
FIG. 22 is still another sectional view of the seventh embodiment, illustrating an alternative form of the double-sided adhesive tape.

Alternatively, as shown in FIG. 22, the width of the double-sided adhesive tape 68 can be enlarged so that the double-sided adhesive tape 68 can be adhered to an outer wall face of the main surrounding wall 12, the bottom wall 11, and a signal transmission wire 69, simultaneously.

Figure 23:
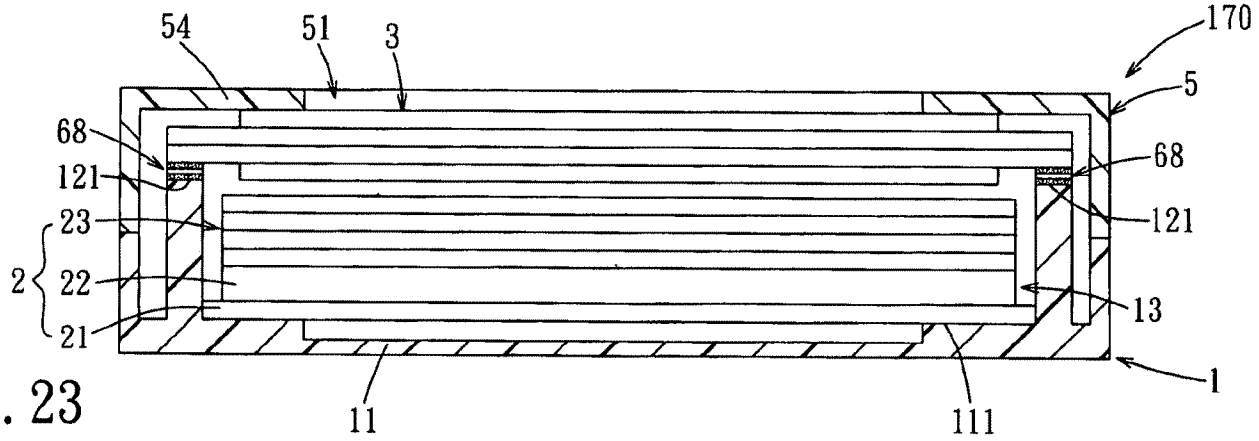
FIG. 23 is a sectional view of a liquid crystal display device according to the eighth embodiment of the present disclosure.

Referring to FIG. 23, a liquid crystal display device 170 according to the eighth embodiment of this disclosure has an overall structure similar to that of the seventh embodiment. However, in this embodiment, the liquid crystal display device 170 comprises two double-sided adhesive tapes 68 to adhere the liquid crystal display panel 3 to two opposite sides of the second support 121. Hence, the liquid crystal display panel 3 can be stably adhered to the second support 121 of the support frame 1.

Figure 24:
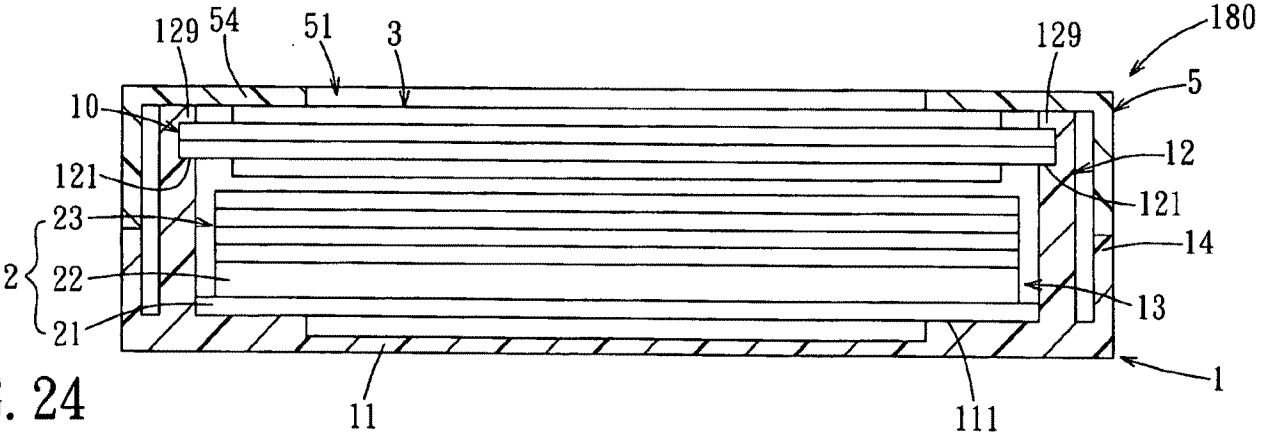
FIG. 24 is a sectional view of a liquid crystal display device according to the ninth embodiment of the present disclosure.

Referring to FIG. 24, a liquid crystal display device 180 according to the ninth embodiment of this disclosure has an overall structure similar to that of the seventh embodiment. However, in this embodiment, the main surrounding wall 12 further includes two retention portions 129 projecting respectively from two opposite sides of the second support 121 to retain two opposite sides of the liquid crystal display panel 3 in the retention holes 10. Similarly, the liquid crystal display panel 3 can be positioned stably on the second support 121 of the support frame 1.

Figure 25:
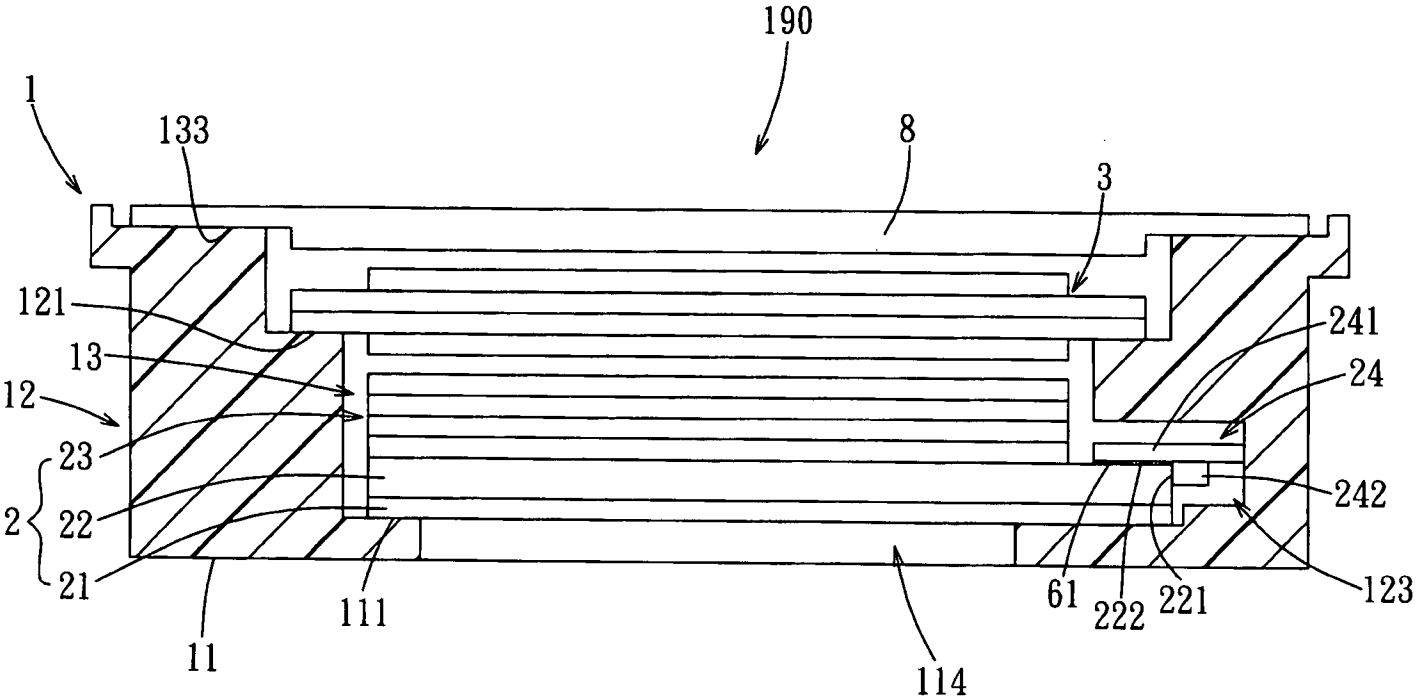
FIG. 25 is a sectional view of a liquid crystal display device according to the tenth embodiment of the present disclosure.

Referring to FIG. 25, a liquid crystal display device 190 according to the tenth embodiment of this disclosure has an overall structure similar to that of the first embodiment. However, in this embodiment, the main surrounding wall 12 of the support frame 1 further includes a third support 133 spacedly above the second support 112 and having a horizontal support face. The liquid crystal display device 190 further includes a touch control panel 8 supported on the third support 133. In this embodiment, the touch control panel 8 is a capacitive touch control panel that is adhered fixedly to the third support 133 by using glue or double-sided adhesive tape so as to be positioned stably above the liquid crystal display panel 3. Because the liquid crystal display panel 3 and the touch control panel 8 are respectively positioned on the second and third supports 121, 133 of the support frame 1, accuracy of assembly between the liquid crystal display panel 3 and the touch control panel 8 can be enhanced, and the accumulated tolerance of the components can be reduced.

Figure 26:
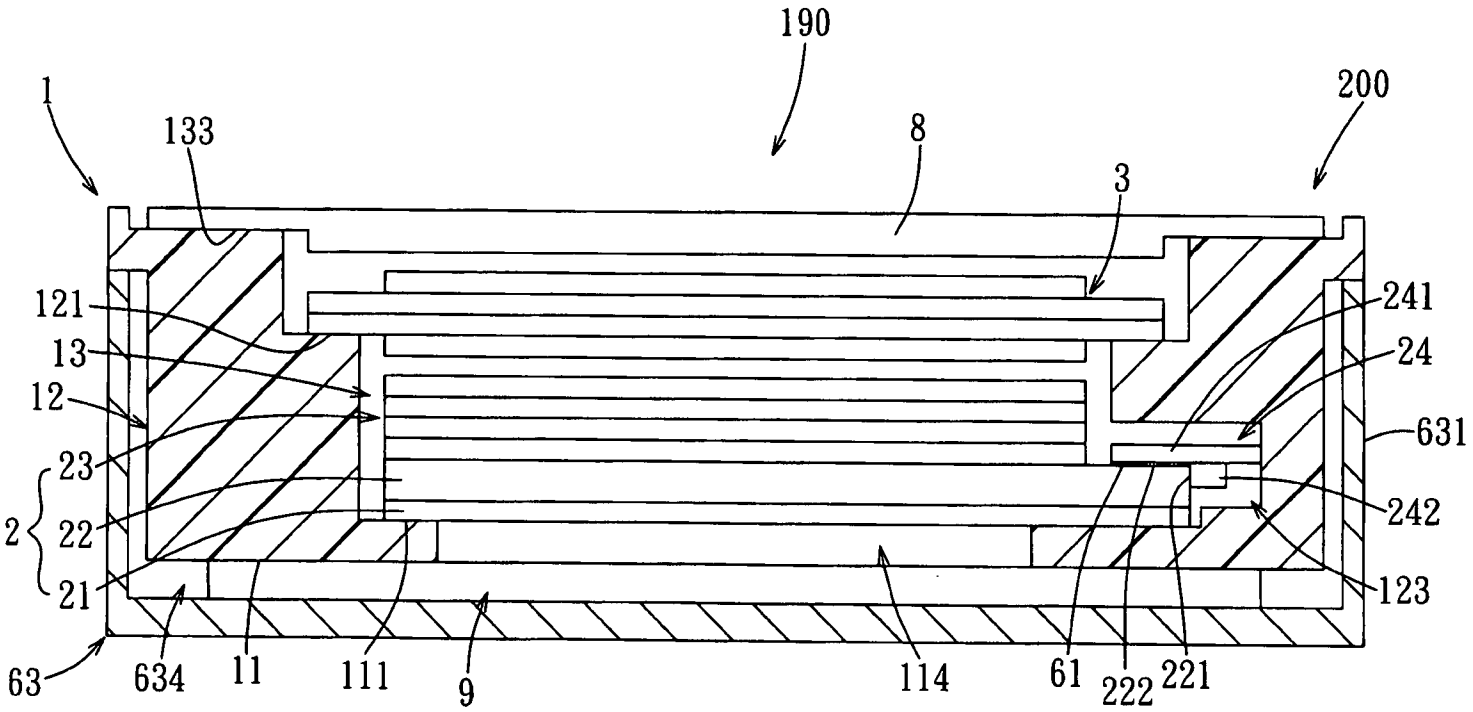
FIG. 26 is a sectional view of an electronic equipment of the present disclosure.

Referring to FIG. 26, the liquid crystal display device 190 is applied in an electronic equipment 200, such as a tablet computer. In this case, a lower casing 63 having a mounting space 634 is provided. The electronic equipment has an electronic device 9 disposed in the mounting space 634. The electronic device 9 includes a motherboard, a hard disk, a battery, and other essential electronic components for providing normal operation of the electronic equipment 200. The liquid crystal display device 190 is disposed in the mounting space 634 such that the bottom wall 11 of the support frame 1 is located above the electronic device 9. An outer peripheral wall 631 of the lower casing 63 surrounds an outer periphery of the main surrounding wall 12 of the support frame 1, and abuts against the support frame 1. The outer peripheral wall 631 and the main surrounding wall 12 may be interconnected to each other such as by using a hook-and-groove interlocking means or a screw fastening means. The center of the bottom wall 11 is formed with a through hole 114 in spatial communication with the receiving space 13. The electronic device 9 can transmit power and signals to the backlight module 2, the liquid crystal display panel 3 and the touch control panel 8 of the liquid crystal display device 190 by using a cable (not shown) that extends through the through hole 114. By embodying the liquid crystal display device 190 of this disclosure, the number of components of the electronic equipment 200 can be reduced, so that the assembly time and the manufacturing costs thereof can be saved. It should be noted that the connection between the outer peripheral wall 631 and the main surrounding wall 12 is not limited to the aforesaid disclosures.

In summary, the liquid crystal display device 100-190 of each of the embodiments uses the first and second supports 111, 121 of the integrally formed support frame 1 to support the backlight module 2 and the liquid crystal display panel 3, respectively, so that the number of components of the liquid crystal display device 100-190 can be reduced and the structure of the liquid crystal display device 100-190 simple. Further, the assembly time can be shortened, the manufacturing costs can be saved, and the accumulated tolerance of the components can be reduced. Hence, the objects of this disclosure can be realized.

While the present disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A [liquid crystal] display device *with a backlight module* comprising:

a support frame including a bottom wall, and a main surrounding wall extending upwardly from [and formed integrally as one piece with] said bottom wall, said bottom wall and said surrounding wall cooperatively defining a receiving space, said bottom wall including a first support disposed in said receiving space, said main surrounding wall including a second support disposed in said receiving space and spacedly above said first support, *wherein said main surrounding wall includes a left wall, a right wall, a front wall and a rear wall, said rear wall including a positioning structure to position said backlight module, said positioning structure includes a positioning groove and a positioning stud provided in said positioning groove*;

[a] *said* backlight module supported on said first support, *said backlight module including an optical film layer that has a projection engaged to said positioning groove and formed with a positioning hole for extension of said positioning stud there through*; and a [liquid crystal] display panel supported on said second support so that said [liquid crystal] display panel is positioned above said backlight module;

wherein each of said first support and said second support has a horizontal support face;

wherein said backlight module includes a light guide plate having a lateral side, and a light-emitting unit disposed on said lateral side, said main surrounding wall being recessed to form a cavity that is spacedly below said second support, said light-emitting unit being disposed in said cavity; and wherein said light guide plate further has a top side connected to a top end of said lateral side, said light-emitting unit including a flexible circuit board, and a light-emitting diode disposed on a bottom side of said flexible circuit board and corresponding in position to said lateral side of said light guide plate, said [liquid crystal] display device further comprising an adhesive piece adhered to and disposed between said top side of said light guide plate and said flexible circuit board.

2. The [liquid crystal] display device as claimed in claim 1, wherein said support frame is formed with an accommodation groove, said [liquid crystal] display device further comprising a control circuit board disposed in said accommodation groove, and a flexible transmission circuit connected electrically to said [liquid crystal] display panel and said control circuit board.

3. The [liquid crystal] display device as claimed in claim 2, wherein said bottom wall has a bottom face that is recessed to form said accommodation groove, said flexible transmission circuit being configured as a circuit band made by a chip on film (COF) technology, said flexible transmission circuit being bent downward and then inward extending around said support frame to connect with said control circuit board.

[4. The liquid crystal display device as claimed in claim 1, wherein said main surrounding wall includes a left wall, a right wall, a front wall and a rear wall, said rear wall including a positioning structure to position said backlight module.]

[5. The liquid crystal display device as claimed in claim 4, wherein said positioning structure includes a positioning groove and a positioning stud provided in said positioning groove, said backlight module including an optical film layer that has a projection engaged to said positioning groove and formed with a positioning hole for extension of said positioning stud therethrough.]

6. The [liquid crystal] display device as claimed in claim [4] *1*, wherein said main surrounding wall further includes a third support spacedly above said second support and having a horizontal support face, said [liquid crystal] display device further comprising a touch control panel supported on said third support.

7. The [liquid crystal] display device as claimed in claim 1, further comprising at least one double-sided adhesive tape adhering said [liquid crystal] display panel to one side of said second support.

8. The [liquid crystal] display device as claimed in claim 7, wherein said main surrounding wall includes a retention portion projecting from the other side of said second support to retain said [liquid crystal] display panel thereon.

9. The [liquid crystal] display device as claimed in claim 7, wherein said double-sided adhesive tape includes a pull portion exposed partially from said [liquid crystal] display panel, and two double-sided adhesive portions adhered to two opposite sides of said pull portion, said double-sided adhesive portions being further adhered to said one side of said second support and said [liquid crystal] display panel, respectively.

10. The [liquid crystal] display device as claimed in claim 7, further comprising two said double-sided adhesive tapes to adhere said [liquid crystal] display panel to two opposite sides of said second support.

11. The [liquid crystal] display device as claimed in claim 1, wherein said main surrounding wall includes two retention portions projecting respectively from two opposite sides of said second support to retain said [liquid crystal] display panel thereon.

12. The [liquid crystal] display device as claimed in claim 1, wherein said main surrounding wall further includes a third support spacedly above said second support and having a horizontal support face, said [liquid crystal] display device further comprising a touch control panel supported on said third support.

13. A [liquid crystal] display device *with a backlight module* comprising:

a support frame including a bottom wall, and a main surrounding wall extending upwardly from [and formed integrally as one piece with] said bottom wall, said bottom wall and said surrounding wall cooperatively defining a receiving space, said bottom wall including a first support disposed in said receiving space, said main surrounding wall including a second support disposed in said receiving space and spacedly above said first support, *wherein said main surrounding wall includes a left wall, a right wall, a front wall and*

*a rear wall, said rear wall including a positioning structure to position said backlight module, said positioning structure includes a positioning groove and a positioning stud provided in said positioning groove*;

[a] *said* backlight module supported on said first support, *said backlight module including an optical film layer that has a projection engaged to said positioning groove and formed with a positioning hole for extension of said positioning stud therethrough*; [and]

a [liquid crystal] display panel supported on said second support so that said [liquid crystal] display panel is positioned above said backlight module;

wherein each of said first support and said second support has a horizontal support face;

wherein said backlight module includes a light guide plate having a lateral side, and a light-emitting unit disposed on said lateral side, said main surrounding wall being recessed to form a cavity that is spacedly below said second support, said light-emitting unit being disposed in said cavity; and wherein said light guide plate further has a bottom side connected to a bottom end of said lateral side, said light-emitting unit including a flexible circuit board abutting against said first support, and a light-emitting diode disposed on a top side of said flexible circuit board and corresponding in position to said lateral side of said light guide plate, said [liquid crystal] display device further comprising an adhesive piece adhered to and disposed between said bottom side of said light guide plate and said flexible circuit board.

14. The [liquid crystal] display device as claimed in claim 13, wherein said main surrounding wall further includes a third support spacedly above said second support and having a horizontal support face, said [liquid crystal] display device further comprising a touch control panel supported on said third support.

15. A [liquid crystal] display device *with a backlight module* comprising:

a support frame including a bottom wall, and a main surrounding wall extending upwardly from [and formed integrally as one piece with] said bottom wall, said bottom wall and said surrounding wall cooperatively defining a receiving space, said bottom wall including a first support disposed in said receiving space, said main surrounding wall including a second support disposed in said receiving space and spacedly above said first support, *wherein said main surrounding wall includes a left wall, a right wall, a front wall and a rear wall, said rear wall including a positioning structure to position said backlight module, said positioning structure includes a positioning groove and a positioning stud provided in said positioning groove*;

[a] *said* backlight module supported on said first support, *said backlight module including an optical film layer that has a projection engaged to said positioning groove and formed with a positioning hole for extension of said positioning stud therethrough*; [and]

a [liquid crystal] display panel supported on said second support so that said [liquid crystal] display panel is positioned above said backlight module;

wherein each of said first support and said second support has a horizontal support face;

wherein said backlight module includes a light guide plate having a lateral side, and a light-emitting unit disposed on said lateral side, said main surrounding wall being recessed to form a cavity that is spacedly below said second support, said light-emitting unit being disposed in said cavity; and wherein said support frame is made by injection molding a plastic material, said light-emitting unit including a flexible circuit board, and a light-emitting diode disposed on a top side of said flexible circuit board, said [liquid crystal] display device further comprising a metal frame disposed in said cavity and receiving clampingly said light-emitting unit and said light guide plate.

16. The [liquid crystal] display device as claimed in claim 15, wherein said metal frame is fixed to said support frame, and includes a vertical plate, a lower clamping plate extending horizontally and inwardly from a bottom end of said vertical plate, and an upper clamping plate extending horizontally and inwardly from a top end of said vertical plate, said lower clamping plate abutting against said first support and engaging a bottom side of said flexible circuit board, said upper clamping plate engaging a top end of said light-emitting diode and a top side of said light guide plate that is connected to a top end of said lateral side of said light guide plate so that said light-emitting diode is positioned at a location corresponding to said lateral side of said light guide plate.

17. The [liquid crystal] display device as claimed in claim 15, wherein said main surrounding wall further includes a third support spacedly above said second support and having a horizontal support face, said [liquid crystal] display device further comprising a touch control panel supported on said third support.

18. A [liquid crystal] display device *with a backlight module* comprising:

a support frame including a bottom wall, and a main surrounding wall extending upwardly from [and formed integrally as one piece with] said bottom wall, said bottom wall and said surrounding wall cooperatively defining a receiving space, said bottom wall including a first support disposed in said receiving space, said main surrounding wall including a second support disposed in said receiving space and spacedly above said first support, *wherein said main surrounding wall includes a left wall, a right wall, a front wall and a rear wall, said rear wall including a positioning structure to position said backlight module, said positioning structure includes a positioning groove and a positioning stud provided in said positioning groove*;

[a] *said* backlight module supported on said first support, *said backlight module including an optical film layer that has a projection engaged to said positioning groove and formed with a positioning hole for extension of said positioning stud therethrough*;

a [liquid crystal] display panel supported on said second support so that said [liquid crystal] display panel is positioned above said backlight module; and an upper casing that covers a periphery of said [liquid crystal] display panel and that is formed with an opening to expose said [liquid crystal] display panel;

wherein said support frame is made of a plastic material and includes two extension plates extending respectively from two opposite sides of said main surrounding wall, said [liquid crystal] display device further comprising a lower casing that is made of metal, that covers said support frame, and that is coupled to said upper casing, two coupling rods each disposed between said lower casing and a respective one of said extension plates, and two fasteners, each of said fasteners fixing one of said coupling rods and the respective said extension plate to said lower casing.

19. The [liquid crystal] display device as claimed in claim 18, wherein said upper casing includes a first coupling portion, said [liquid crystal] display panel further including a glass to cover said opening, said glass including a second coupling portion coupled to said first coupling portion.

20. The [liquid crystal] display device as claimed in claim 19, wherein said first coupling portion is an inner periphery of said upper casing and defines said opening, said second coupling portion being configured as an annular groove to receive engagingly said inner periphery.

21. The [liquid crystal] display device as claimed in claim 18, wherein said main surrounding wall further includes a third support spacedly above said second support and having a horizontal support face, said [liquid crystal] display device further comprising a touch control panel supported on said third support.

* * * * *